(12) United States Patent
Jitaru

(10) Patent No.: US 11,929,198 B2
(45) Date of Patent: *Mar. 12, 2024

(54) LOW NOISE MULTILAYER TRANSFORMER

(71) Applicant: Rompower Technology Holdings, LLC, Milford, DE (US)

(72) Inventor: Ionel Jitaru, Tucson, AZ (US)

(73) Assignee: Rompower Technology Holdings, LLC, Milford, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/948,966

(22) Filed: Sep. 20, 2022

(65) Prior Publication Data

US 2023/0016363 A1    Jan. 19, 2023

Related U.S. Application Data

(63) Continuation of application No. 17/524,495, filed on Nov. 11, 2021, now Pat. No. 11,450,470.

(Continued)

(51) Int. Cl.
*H01F 27/28* (2006.01)
*H01F 27/24* (2006.01)
*H01F 27/34* (2006.01)
*H02M 1/44* (2007.01)
*H02M 3/335* (2006.01)

(52) U.S. Cl.
CPC ............. *H01F 27/28* (2013.01); *H01F 27/24* (2013.01); *H01F 27/346* (2013.01); *H02M 1/44* (2013.01); *H02M 3/335* (2013.01)

(58) Field of Classification Search
CPC ........ H01F 27/28; H01F 27/24; H01F 27/346; H01F 27/289; H01F 27/363; H01F 27/38; H01F 2027/2809; H01F 2027/2819; H01F 27/2804; H02M 1/44; H02M 3/335;
(Continued)

(56) References Cited

U.S. PATENT DOCUMENTS 6,466,454 B1    10/2002   Jitaru
11,450,470 B2 *   9/2022   Jitaru ..................... H01F 27/38
(Continued)

FOREIGN PATENT DOCUMENTS

CN    104425117    3/2015

*Primary Examiner* — Jared Fureman
*Assistant Examiner* — Michael J Warmflash
(74) *Attorney, Agent, or Firm* — Thomas W. Galvani, P.C.; Thomas W. Galvani

(57) ABSTRACT

A magnetic structure in a power converter includes at least two multilayer boards, such as a primary board containing the primary windings and some auxiliary windings, and a secondary board containing the secondary windings and some auxiliary windings. The primary and secondary boards are on top of each other. On the layer on the primary board adjacent to the secondary board, is a dual function shield to reduce the total common mode noise in the converter towards zero. The controlled dual function shield can be placed on the secondary board on the layer adjacent to the primary board, and in some embodiments can be placed on both primary and secondary board on the layers adjacent to the other board. The embodiments herein offer a very good solution for cost reduction of the planar transformers and offers an avenue for total elimination of the common mode noise in a power converter.

9 Claims, 23 Drawing Sheets

Related U.S. Application Data

(60) Provisional application No. 63/112,564, filed on Nov. 11, 2020.

(58) Field of Classification Search
CPC .. H02M 1/123; H02M 3/003; H02M 3/33592; Y02B 70/10
See application file for complete search history.

(56) References Cited

U.S. PATENT DOCUMENTS

| | | | |
|---|---|---|---|
| 2009/0212754 A1* | 8/2009 | Ryan | H02M 3/335 323/282 |
| 2010/0109832 A1* | 5/2010 | Espino | H01F 27/38 336/84 C |
| 2017/0163164 A1* | 6/2017 | Martin | H01F 38/00 |
| 2017/0200552 A1* | 7/2017 | Chung | H01F 27/2885 |
| 2020/0211762 A1* | 7/2020 | Jitaru | H02M 3/155 |
| 2021/0287849 A1* | 9/2021 | Kawaguchi | H02M 3/33569 |

\* cited by examiner

LOW NOISE MULTILAYER TRANSFORMER

CROSS REFERENCE TO RELATED APPLICATIONS

This application is a continuation of and claims the benefit of U.S. patent application Ser. No. 17/524,495, filed Nov. 11, 2021, which claims the benefit of U.S. Provisional Application No. 63/112,564, filed Nov. 11, 2020, both of which are hereby incorporated by reference in their entireties.

FIELD

The present invention relates generally to electronic power conversion, and more particularly to magnetic transformers.

BACKGROUND

In the quest for high density power converters, there is a focus is on the efficiency and also and also in the miniaturization of the magnetic elements and on the reduction of the number of components.

In the recent years there is a trend for the power adapters to decrease the size, fueled by the fact that the electronic devices powered by the AC-DC adapters such as laptops, mobile phones have decreased significantly in size.

One key element in a power converter is the magnetic transformer. The magnetic transformer occupies a significant volume in the power adapters, ranging from 20% to 40% or even more. The embodiments of this patent offers several solutions in increasing the power density of the magnetic transformers in power conversion application with very high density while minimizing the power dissipation. In the same time in the recent years adapters with power delivery have been introduced wherein the output voltage range varies from 3.3V to 20V which is a range of 6:1. The input voltage range varies from 90 Vac to 265 Vac, that is a range of 3:1. With such a large input and output range the most suitable topology for the AC-DC adapters is flyback topology. Unlike the forward topology, wherein the magnetic transformer is used to transfer power from primary to secondary via the isolation boundaries, the flyback transformer provide two functions. The first function is to transfer power from primary to secondary during the off time of the main switch while storing energy in the transformer during the on time of the main switch. In forward topology, the power transformer transfers the energy form primary to secondary during the time wherein the primary switchers are on and there is another magnetic element, referred as the output choke, which function is to store the energy during the time the primary switchers are on and further to transfer that energy to the output towards the load when the primary switchers are off.

In Flyback topology both functions are produced by only one magnetic element, referred in this application as Flyback transformer.

Presently, most laptops, tablets require for operation a power level ranging from 30 W to 65 W. Due to the significant technological advancement in portable computing devices, the size of laptops and tablets has been significantly reduced, and yet the AC-DC adapters used to power such devices remain quite large (for example, dimensions of a typical adaptor for a small tablet device are about 3.3" by 1.8" by 1.3" or so). This has created pressures for size reduction of AC-DC adapters. To reduce the size of the adapters while maintaining the convection-based cooling methodology used today requires some significant improvement in efficiency of the adapters as well as a decrease of size of the magnetic and capacitive storage elements.

Besides the power transformer, another section of the AC-DC adapter which occupies a large volume is the input EMI filter. The EMI filter occupies approximately 10%-20% of the volume of an AC-DC adapter.

This patent will present several embodiments which will integrate some of the common mode EMI filter functions in the transformer itself.

SUMMARY

In one embodiment, and without limitation, a system for reducing common-mode noise includes components of a switch mode power supply including primary and secondary sides, primary and secondary side grounds, an input voltage source, a primary switch, a transformer, a core, and a power output, wherein the primary side and the secondary side have primary and secondary quiet terminations, respectively, wherein voltage does not change with respect to the primary side ground and with respect to the secondary side ground. A magnetic element contains a magnetic core having at least two magnetic legs. The system includes a primary multilayer board which embeds primary windings and first auxiliary windings which report to the primary windings, wherein the primary windings and the first auxiliary windings surround the magnetic legs. The system also includes a secondary multilayer board which embeds secondary windings and second auxiliary windings which report to the secondary windings, wherein the secondary windings and second auxiliary windings surround the magnetic legs. The magnetic core penetrates both the primary multilayer board and the secondary multilayer board. The primary and secondary multilayer boards are placed on top of each other. A layer of the primary multilayer board which is adjacent to the secondary multilayer board includes a controlled dual function shield which is connected to the primary quiet termination.

The above provides the reader with a very brief summary of some embodiments described below. Simplifications and omissions are made, and the summary is not intended to limit or define in any way the disclosure. Rather, this brief summary merely introduces the reader to some aspects of some embodiments in preparation for the detailed description that follows.

BRIEF DESCRIPTION OF THE DRAWINGS

Referring to the Drawings.

DETAILED DESCRIPTION

Figure 1:
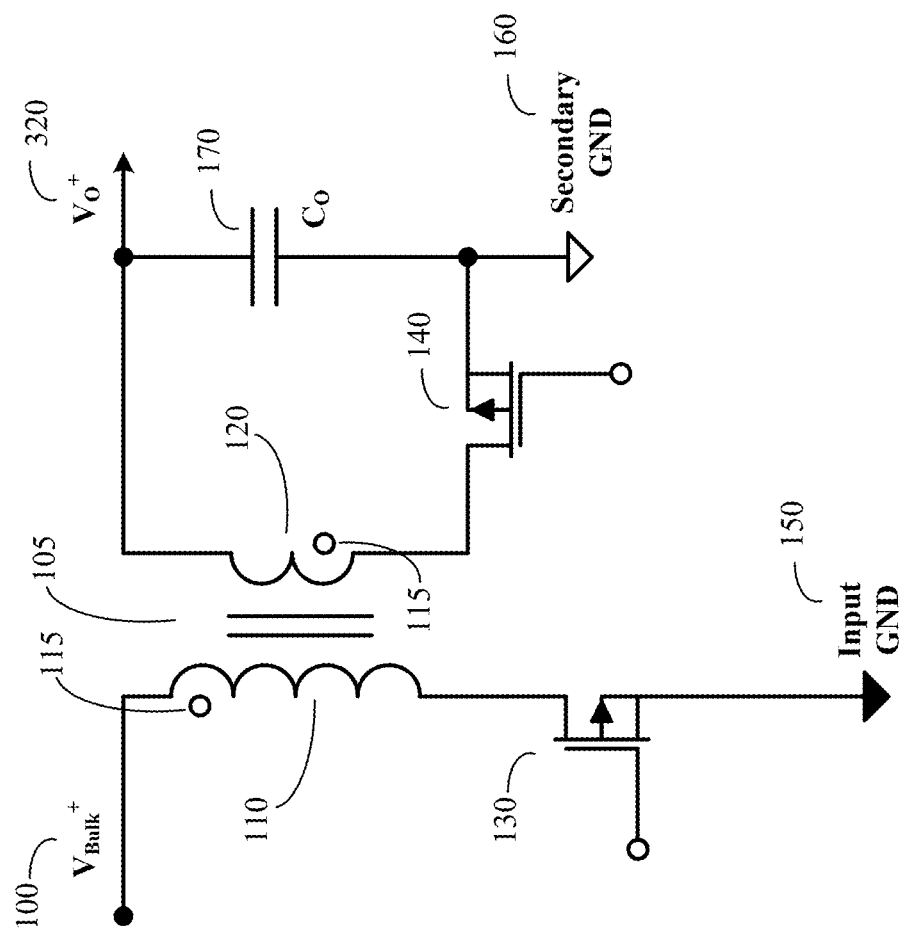
FIG. 1 presents a schematic of a flyback convertor.

Reference now is made to the drawings, in which the same reference characters are used throughout the different figures to designate the same elements. Briefly, the embodiments presented herein are preferred exemplary embodiments and are not intended to limit the scope, applicability, or configuration of all possible embodiments, but rather to provide an enabling description for all possible embodiments within the scope and spirit of the specification. Description of these preferred embodiments is generally made with the use of verbs such as "is" and "are" rather than "may," "could," "includes," "comprises," and the like, because the description is made with reference to the drawings presented. One having ordinary skill in the art will understand that changes may be made in the structure, arrangement, number, and function of elements and features without departing from the scope and spirit of the specification. Further, the description may omit certain information which is readily known to one having ordinary skill in the art to prevent crowding the description with detail which is not necessary for enablement. Indeed, the diction used herein is meant to be readable and informational rather than to delineate and limit the specification; therefore, the scope and spirit of the specification should not be limited by the following description and its language choices.

In U.S. Pat. No. 5,990,776 entitled "Low noise full integrated multilayers magnetic for power converters" Jitaru is presented a technology wherein the winding of the magnetic elements such is the transformer are embedded in the multiplayer PCB, multilayer PCB which is also the mechanical support for the power components and signal components. A planar transformer has a larger footprint than a conventional transformer and that will reduce the space for the rest of the components on a given package. The main embodiment of Jitaru patent was that all the winding of the planar transformer to be sandwich between at least two layers, a top layer and a bottom layer, layers which are used as support for components especially the key power components, such as the synchronous rectifiers, which have to be placed close to the transformer secondary winding in order to minimize the stray inductance. In Jitaru patent the footprint of the transformer is reduced to the footprint of the magnetic core.

Other embodiments of Jitaru patent are related to the common mode noise reduction by placing the windings in the planar transformer in a such way to minimize the displacement current through the parasitic capacitance in between the windings especially through the parasitic capacitance between primary and secondary windings.

One disadvantage of the embodiments in the U.S. Pat. No. 5,990,776 is the fact that the primary windings and the secondary windings are placed on the same multilayer PCB and the parasitic capacitance in between primary winding and secondary is high increasing the common mode noise. Jitaru presents several solutions to decrease common mode noise by the proper positioning of the windings per layers. The prepreg material used to merge the multilayers of copper foil does have a permeability between 5 to 7 or even higher. That will also increase the parasitic capacitance between two adjacent layers of copper. Another drawback of this concept is the fact that by placing both, primary and secondary on the same multilayer PCB increases the number of layers which increases the cost of the multilayer PCB. In addition to that, in many applications the copper thickness in some of the secondary windings or even the primary windings need to be higher than other layers and that will increase the complexity and the cost of the multilayer PCB transformer.

Though the embodiments of this invention apply to the transformers used in any topology, the description of the embodiments is focused primarily on the flyback topology, but these embodiments can be used in any topology.

In power conversion applications the coupling through the parasitic capacitance between components in the primary side and the secondary side, wherein the voltage on said components varies with a given dV/dt amplitude, displacement current is produced, referred in this patent as "non transformer common mode noise". The "non transformer common mode noise" is adding to the Common Mode EMI produced by displacement current through the transformer. In transformers, the parasitic capacitances between primary to secondary windings leads to displacement currents due to the voltage variation (dV/dt) in the windings. Some shielding techniques can be used in transformers to minimize the displacement current between primary and secondary windings. However, even in the event all the common mode noise created in the transformer is significantly reduced, the "non transformer common mode noise" still remains.

In such cases the goal is to create a "controlled displacement current" in the transformer which has the same amplitude and of opposite polarity of the common mode current created by the other sources in the converter. This technique is known in the field of power conversion as noise cancelation technique.

First Embodiment

In FIG. 1 is presented a simplified schematic of a flyback topology. This basic structure of a flyback topology contains a primary switch 130, a transformer 105, containing a primary winding 110, and a secondary winding 120. The primary winding 110, is connected with one terminal to the dc input voltage $V_{Bulk+}$, 100, and with the second terminal to the drain of the primary switch 130. The secondary winding is connected with a terminal to a synchronous rectifier, 140, and the second terminal to an output capacitor Co, 170. The input section of the flyback is connected to the input GND, 150. The output section of the flyback is connected to the output GND, 160. Both windings, the primary winding 110 and the secondary winding 120, are characterized by a polarity which is defined by the position of the dot, 115. When an ac voltage source is applied to one of the windings of a transformer with the positive polarity of said voltage source at the dot, an ac voltage synchronized with said voltage source will be induced in the rest of the windings with the positive polarity at the dot.

Figure 3:
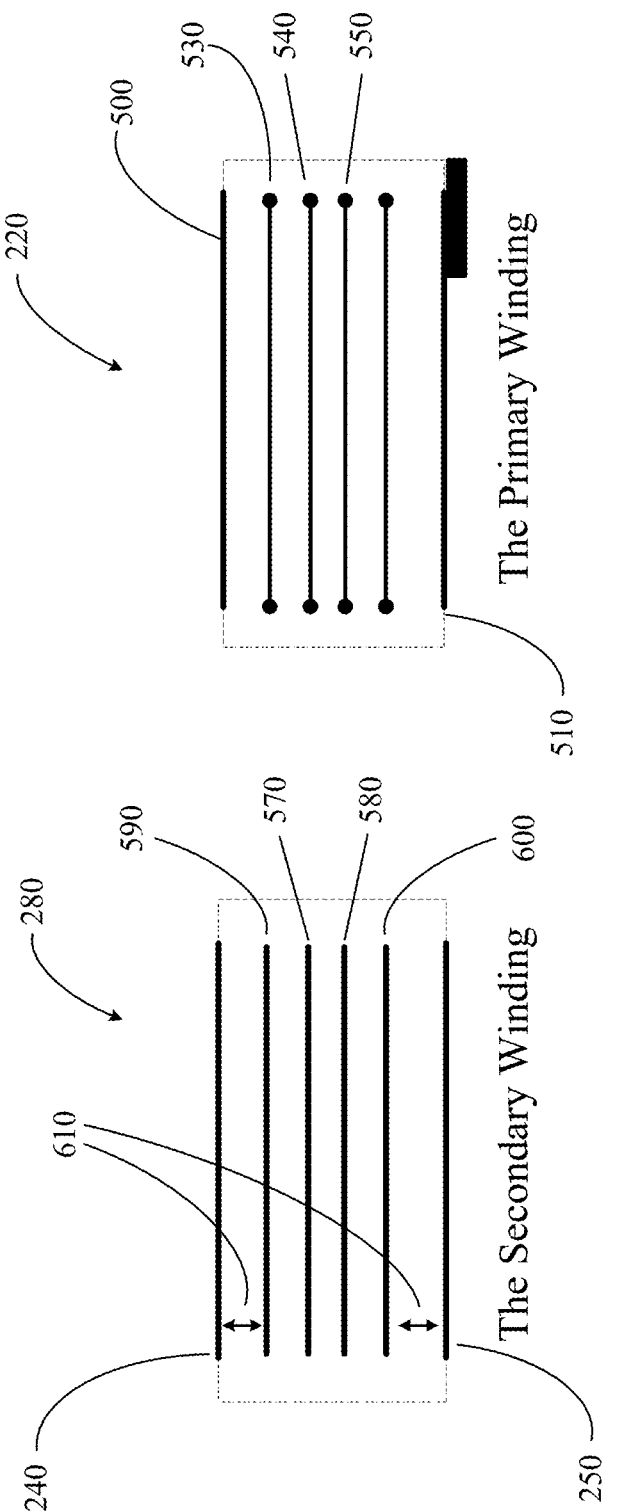
FIG. 3 represents the structure of the primary and secondary board.

In the first embodiment the primary winding is embedded in one multilayer PCB, 220 as depicted in FIG. 3. In FIG. 3 is presented the structure of a multilayer board for primary windings, named the primary board, 220 and the structure of a multilayer board for secondary windings, named the secondary board, 280. The inner layers 530, 540, 550, contain the primary winding, as an example. The top layer, 500 is used as a primary shield which is electrically connected a "quiet termination" for example, the Vbulk, 100, or to input GND, 150, from FIG. 1. There is another primary shield placed on the bottom layer, on the other side of the primary multilayer PCB, on layer 510. A portion of the primary shield, 510 is metalized with the purpose in some applications to make electrical contact with the magnetic core.

As depicted in FIG. 3, the secondary board 280, contains the secondary winding in the layers 570 and 580 as an example. The layer 600 and layer 590 can be used for the secondary shield. The top layer 240 and the bottom layer 250 will not be metalized in this example. The distance, 610, between the layer 590 and the layer 240 and in between layers 600 and 250 also shall have the distance 610, distance 610 which is necessary to comply with the safety agency in many of the cases that distance is 0.4 mm or higher.

Figure 4:
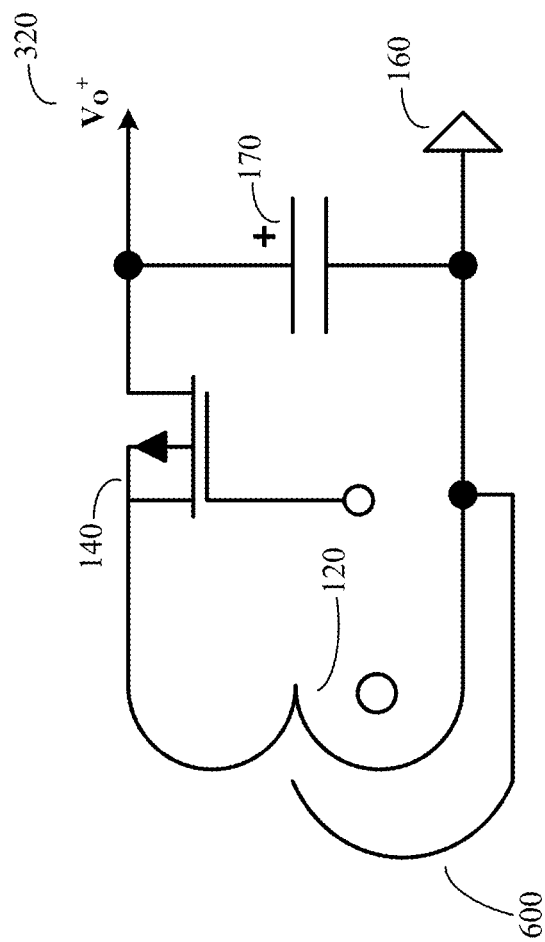
FIG. 4 presents the secondary circuit in a flyback topology in high side implementation.
Figure 5:
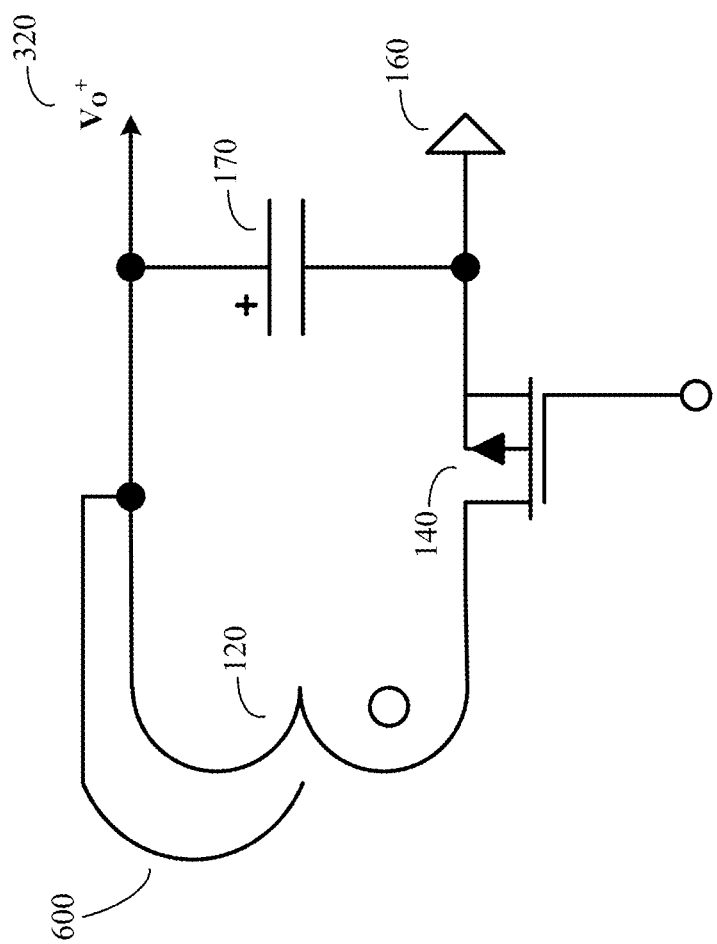
FIG. 5 presents the secondary circuit in a flyback topology in low side implementation.

In FIG. 4 is depicted the configuration of the windings in the secondary board, 280. The secondary windings 120, is placed for example on the layers 570 and 580. There can be two configurations for the secondary. The first configuration from FIG. 4 is referred in the power conversion field as "high side" rectifier, wherein the source of the synchronized rectifier, 140, is connected to the secondary winding, 120, at the non-dot termination.

In FIG. 4, the dot termination of the secondary winding 120, is connected to the secondary GND, 160. The shield 600 will be placed under the secondary windings layers. The winding on the layer 580 is connected to the secondary GND, 160 as depicted in FIG. 4. We introduce in the description of the embodiments of this patent the term of "quiet termination". A quiet termination" in the primary is the primary GND, 160 and the Vbulk+, 100. In the secondary a "quiet termination" is the secondary GND, 160 and the Vo+", 320. Another terminology which we introduce in this patent is the term of "quiet winding". A quiet winding is the winding which has a low voltage swing reported to the "quiet termination", by comparison with the rest of the windings.

The layer 600 of the secondary board 280, which will be placed on top of the primary board, 220, is also named the bottom layer of the secondary board, this is because the layer 250, is not metalized. The layer 240, of the secondary board, 280, is named the top layer of the secondary board and in many application it is not metalized in order to comply with safety agencies.

Figure 2:
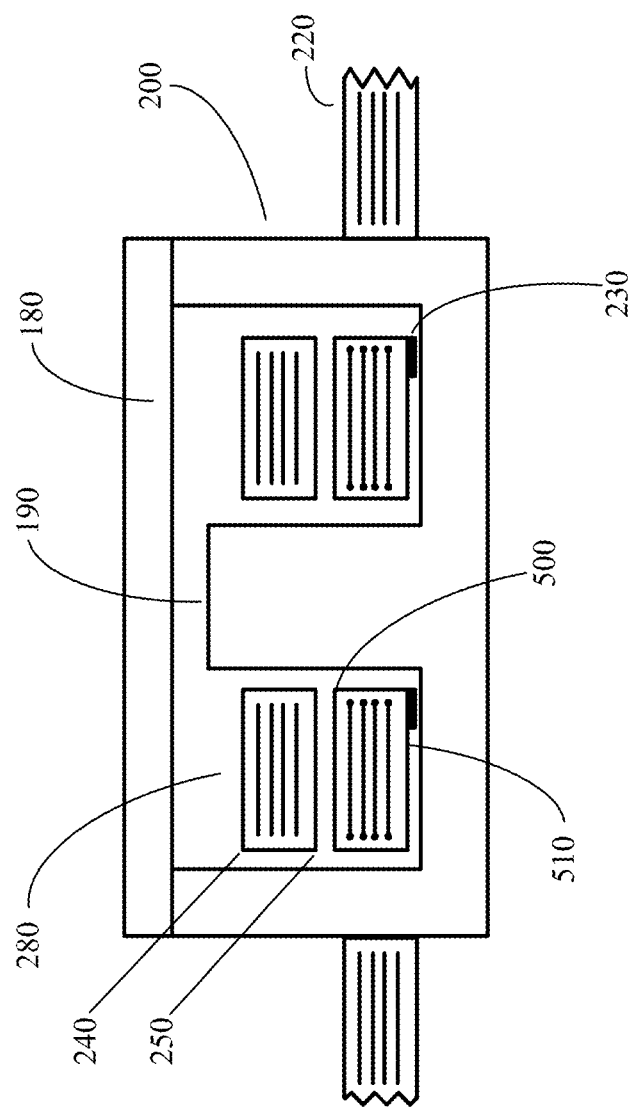
FIG. 2 depicts one of the embodiments wherein a transformer is built by two multilayer boards, one primary board and a secondary board and a magnetic core.

The layer 500, of the primary board 220 is named the top layer of the primary board, and the layer 510, is named the bottom board of the primary board. As depicted in FIG. 2, the bottom layer of the secondary board, 250 is placed above the top layer, 500, of the primary board. The top layer of the primary board is allocated for the shield. The purpose of the shield is to prevent the displacement current induced by the primary winding, via the parasitic capacitance between the primary winding and the secondary winding, to be injected into the secondary winding. The primary shield is connected to the "quiet termination" of the primary which can be primary GND, 150 or Bulk+, 100. The shield placed on the layer 500 will short the displacement current induced by the primary winding via the parasitic capacitance between the primary windings and said primary shield, towards the primary "quiet termination", such as Bulk+, 100 and Input GND 150. In this way said displacement current is prevented from flowing towards the secondary windings and further into the secondary "quiet termination".

In the first embodiment of this invention is claiming a planar transformer formed by a magnetic core, 180, a primary multilayer PCB, 220, which contains the primary winding and some auxiliary windings reported in respect of safety to the primary but none of the secondary windings or auxiliary windings reported in respect of safety to the secondary, and a secondary multilayer PCB board 280 which contains at least the secondary winding and none of the primary windings or auxiliary windings reported in respect of safety to primary side. Said primary board, 220 and said secondary board 280 are placed adjacent to each other. The secondary board can be placed on the top of the primary board, or the primary board can be placed on top of the secondary board. The layer on the surface of said primary board, adjacent to the secondary board contains the shield and said shield is connected to said primary "quiet termination". In some application in order to further decrease the parasitic capacitance between primary and secondary a spacer may be placed in between said primary and secondary boards. That may increase the leakage inductance, though in some application the energy contained in the leakage inductance may be harvested. The capability to control the parasitic capacitance between primary and secondary it will be very useful in application wherein the common mode EMI has to be at a very low level, while maintaining a very low leakage inductance. Such application is the power converters in medical applications.

We define the shield winding as a winding which has a given shape and a given polarity reported to the connection to the primary "quiet termination". The shape of the shield winding will impact the parasitic capacitance between primary shield and the secondary windings. The shape of the shield winding also dictates the amplitude of the voltage across the shield winding and its impedance in reference to the connection to the "quiet termination". A shield winding with several turns and partial turns have a higher voltage at the termination of the shield winding not connected to the primary "quiet termination" increasing in this way the displacement current towards the secondary winding or towards the secondary shield. A wider winding will have a larger parasitic capacitance towards the secondary winding which is placed in the proximity of the primary shield. In conclusion the shape of the primary shield controls the parasitic capacitance towards the secondary winding from the secondary board and also the amplitude and polarity of the injection voltage which creates the displacement current between primary "quiet termination" and the secondary windings which are part of the secondary board. In this way the common mode noise in between the primary "quiet termination" and secondary "quiet termination" can be fully controlled in amplitude and polarity by the design of the primary shield placed on top layer of the primary board adjacent to the secondary board. The primary shield has two functions, the first function is to short the displacement current produced by the primary windings via the parasitic capacitances between primary windings and the primary shield, to the primary "quiet termination". The second role of the primary shield is to create a displacement current in between the primary "quiet termination" and the secondary winding from the secondary board, displacement current of a controlled amplitude and polarity in such a way that the common mode noise in between the primary "quiet termination" and secondary "quiet termination" to be zero.

Second Embodiment

Figure 8:
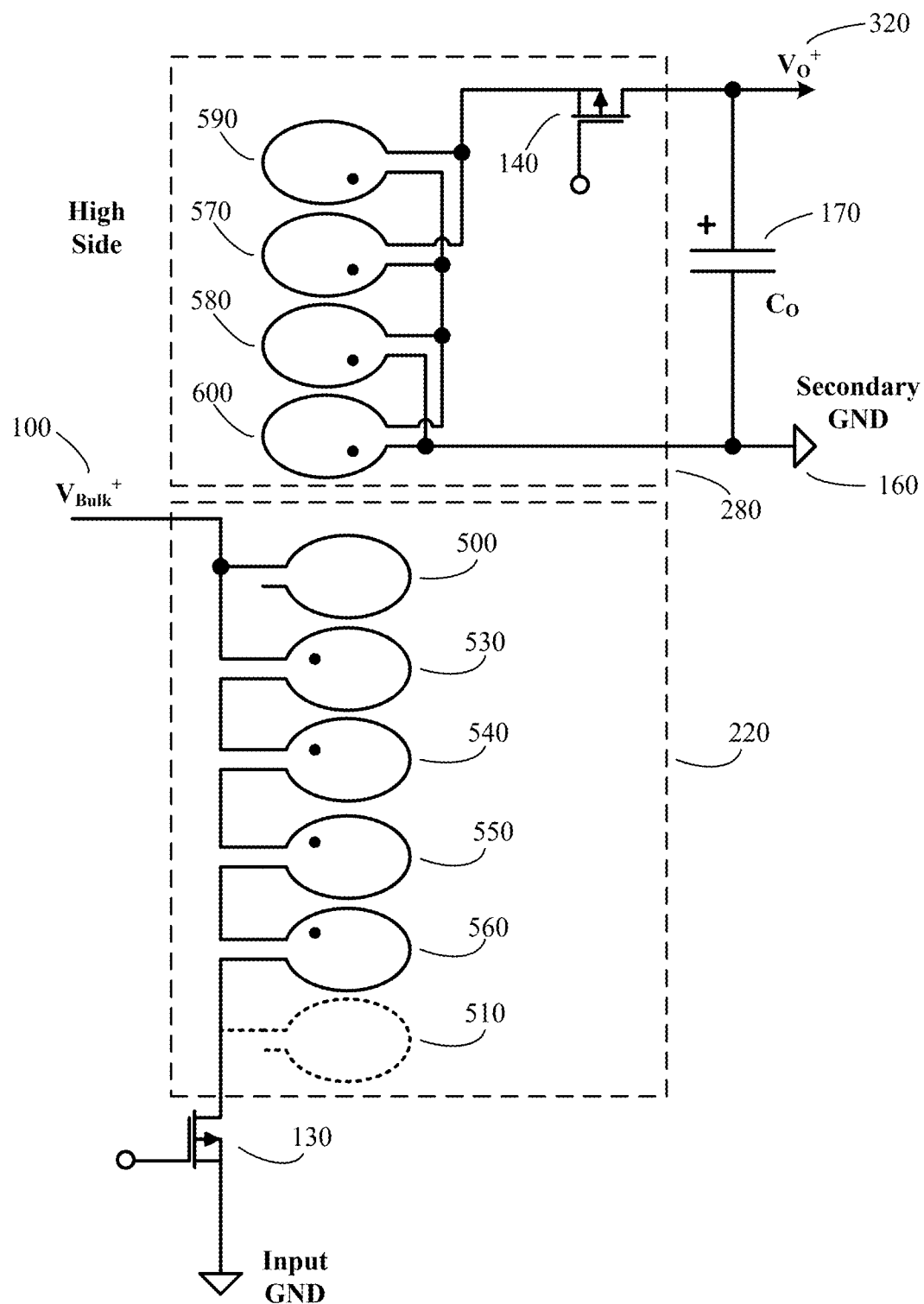
FIG. 8 illustrates one of the embodiments, wherein the secondary uses "high side" SR implementation and the secondary board does not have a shield.

In FIG. 8 is presented the second embodiment of this invention. The primary board, 220 contains a shield placed in the top layer, 500. The other layers, 530, 540, 550 and 560 are sandwiched in between the top layer 500 and bottom layer 510. The winding contained on the layer 530 adjacent to layer 500, is connected to the Vbulk+. For example if the primary winding 110 has 12 layers, on each layer such as 530, 540, 550 and 560, will contain 3 turns. The voltage swing on the winding contained in layer 530, adjacent to the shield, 500, will have a lower voltage swing towards the "quiet termination" Vbulk+ than the rest of the windings, and the winding contained in layer 560 will have the largest voltage swing towards the "quiet termination" Vbulk+, and we will refer to it in this invention as the "noisy" winding. The winding on layer 540, 550 will be also called "noisy" windings even if the amplitude of the voltage swing in reference to the primary "quiet termination" is smaller than the winding on layer 560. The shield placed on the layer 500 is connected to Vbulk+ in this example. The shield placed on the layer 500 can be also connected to the input GND, 150 which is also a primary "quiet termination". The goal is to reduce the amplitude of the displacement current injected in the shield placed on layer 500, from the rest of the windings. For this purpose, we place the "quiet" windings on layer 530 which is adjacent to primary shield layer 500. This placement will decrease the amplitude of the displacement current in between the parasitic capacitance between layer 500 and layer 530. The reduction of the displacement current will decrease the switching losses in the primary windings. The secondary PCB, 280, is placed on top of the primary PCB 220 as depicted in FIG. 8. For safety compliance, the top layer and the bottom layer of the secondary board there will not have copper. In addition to that the distance between the winding placed on layer 590 and top layer 240, distance, 610 and the distance between layer 600 and layer 250 will have a safety approved distance, 610, as it was depicted in FIG. 3. Function of the RMS voltages the windings in primary and secondary that safety distance may vary. In the second embodiment of this invention there will not be a shield in the secondary board. This will allow to use a secondary PCB with a reduced number of layers such as 2 or 4 layers. In the case wherein 4 layer PCB is used for the secondary board, 280, we use all 4 inner layers, 600, 580, 570 and 590 for secondary windings. On the secondary board, 280, we can parallel some of the windings as depicted in FIG. 8. In FIG. 8 the windings on layer 600 are placed in parallel with the winding from layer 580 and the windings on layer 570 is placed in parallel with the windings from layer 590. Because the current sharing in the parallel winding it is not equal in asymmetrical structure as the one from FIG. 8, because the secondary does not sandwich the primary windings, the current amplitude for the secondary windings will be higher for the windings closer to the primary winding. To improve the current sharing the winding from layer 600 shall be paralleled with the winding from layer 590 and the winding from layer 580 shall be in parallel with the winding from layer 570. A series connection of the winding in secondary board will ensure a more equal distribution of the current through the secondary layers.

The location of the rectifier means, 140 and the connection of the secondary winding, which is connected to secondary GND, 160 at the dot, creates a configuration referred in the power conversion field as "high side rectifier".

Without a shield in the secondary the voltage swing of the winding on layer 600 will inject a displacement current into the shield 500 through the parasitic capacitance between the secondary winding in the layer 600 and the shield 500 in the primary, displacement current which will flow into the primary ground. The current flow from the secondary GND, 160 towards the primary GND, 160 is referred in this patent as "common mode noise". The voltage swing in the secondary winding on layer 600 versus the shield 500 of the primary PCB, 220, is lower than the voltage swing on the winding placed in the other layers. To further minimize this common mode noise, the shield 500 has to have the exact imagine as the winding from layer 600 and the same orientation as the secondary winding from layer 600 and the winding from layer 500 will have a voltage swing of the same amplitude and with the same polarity. Jitaru's patent application "Power Transformer for Minimum Noise Injection in between primary and secondary winding Rompower Active Shield", U.S. patent application Ser. No. 16/732,240 filed on Dec. 31, 2019, depicts a similar concept but with some clear differences.

Figure 7:
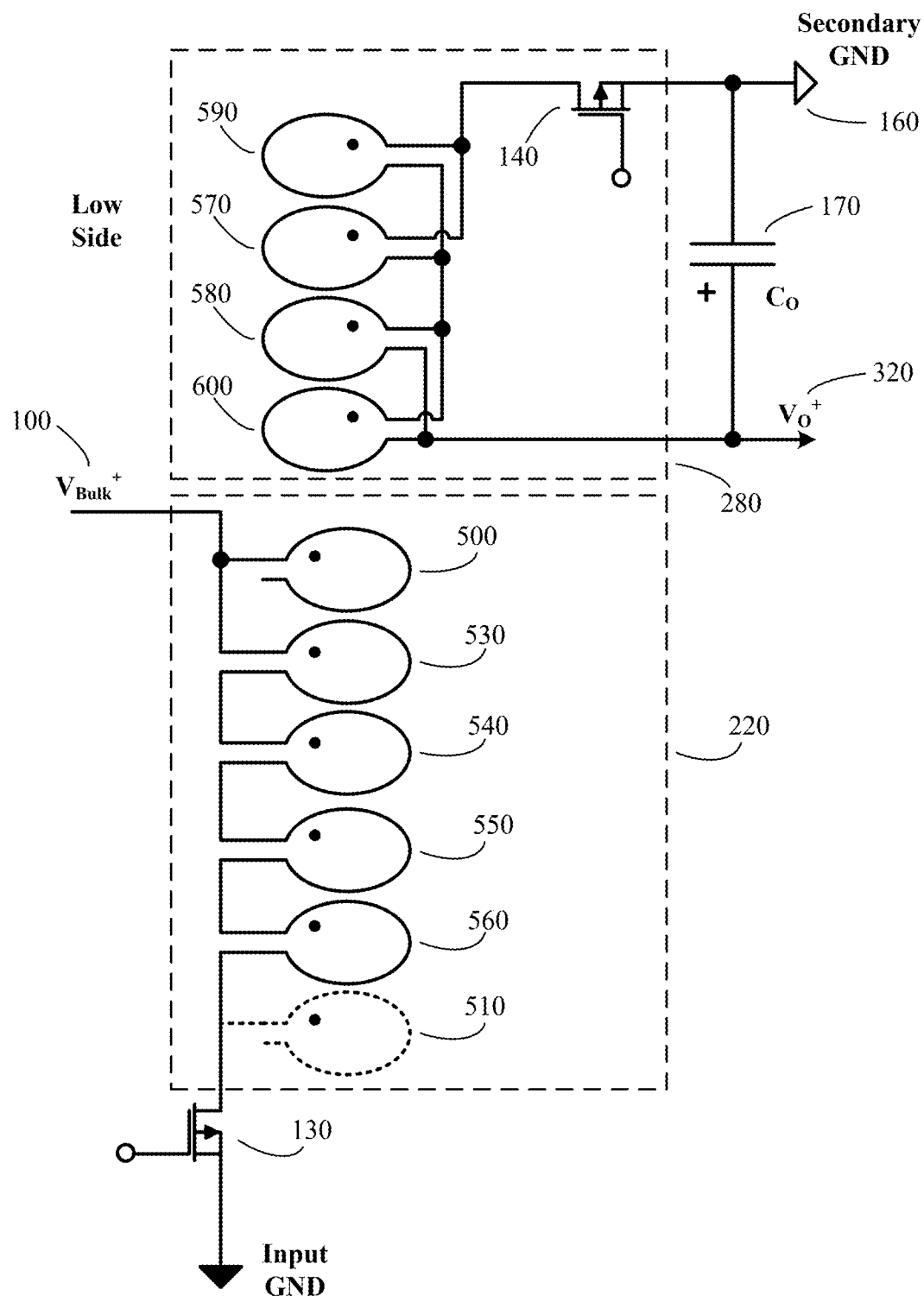
FIG. 7 illustrates one of the embodiments, wherein the secondary uses "low side" SR implementation and the secondary board does not have a shield.

In FIG. 7 is depicted a configuration for the secondary referred in the power conversion field as the "low side rectifier" The winding contained in the layer 600 is connected to a "quiet termination" which is Vo+, 320 in order to minimize the noise injecting from the secondary winding place on the layer 600 into the primary shield, 500, from the primary board, 220.

Like in the high side configuration, to minimize this common mode noise, the shield 500 has to be have the exact imagine on the winding from layer 600 and the same orientation as the winding from layer 600 and the winding from layer 500 will have a voltage swing of the same amplitude and with the same polarity.

The second embodiment of this invention has all the claims of the first embodiment and in addition to this the secondary board does not have a layer allocated for the shield and the layer of the secondary board adjacent to the primary board, layer which contains the primary shield, is connected to the secondary "quiet termination" to Vo+, 320 for the low side implementation in the secondary or to the "quiet termination", secondary GND, 160 in the high side implementation of the secondary. In addition to that the primary shield, placed on the primary board adjacent to the secondary board, shield connected to the primary quiet spot, Vbulk+, is the mirror imagine and the same polarity of the winding on the layer connected to secondary "quiet termination", such as the secondary GND, 160, in the high side secondary configuration or to Vo+, 320 in the low side secondary configuration.

Third Embodiment

Figure 9:
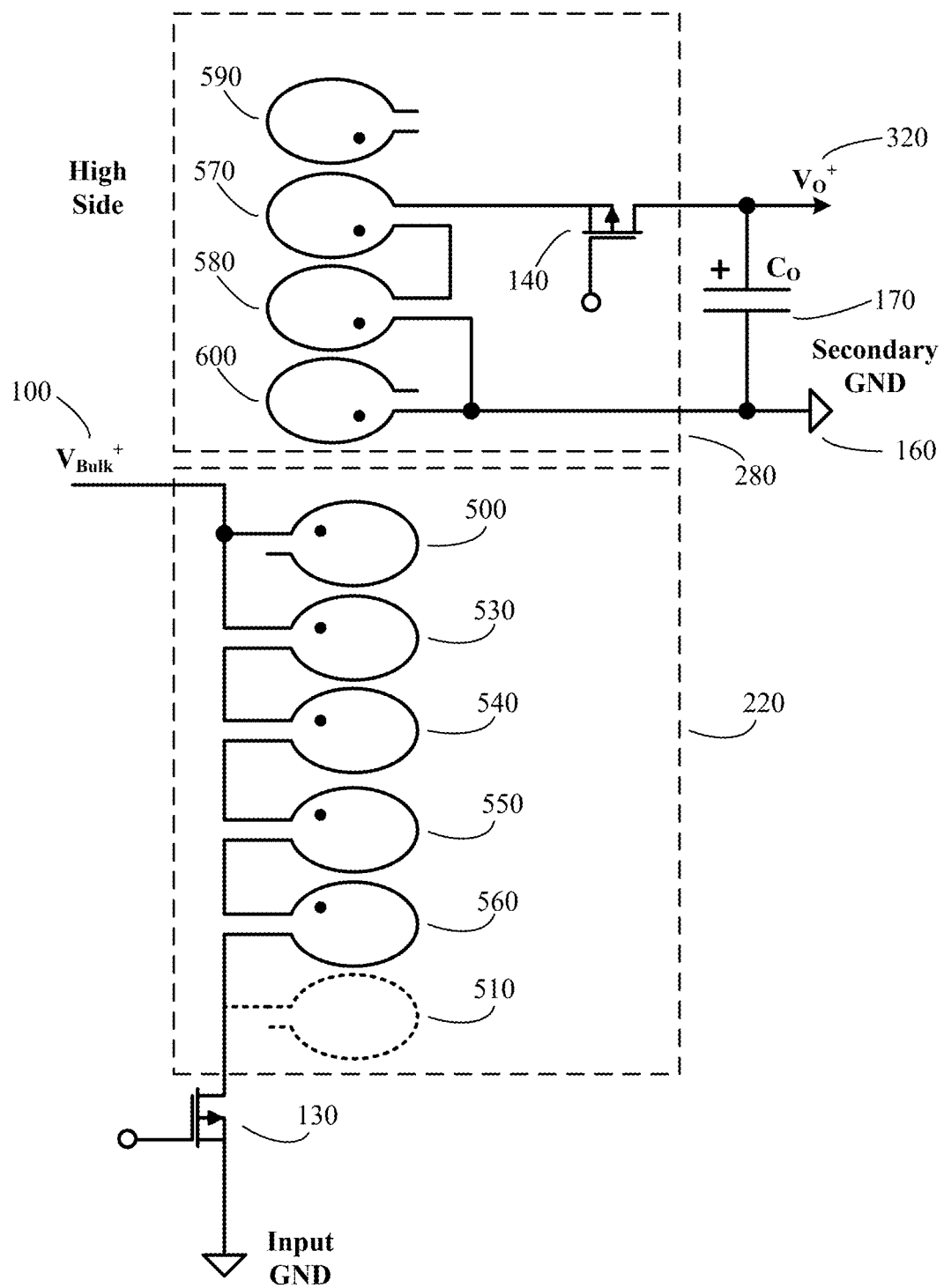
FIG. 9 illustrates one of the embodiments, wherein the secondary uses "high side" SR implementation and the secondary board does have a shield.
Figure 10:
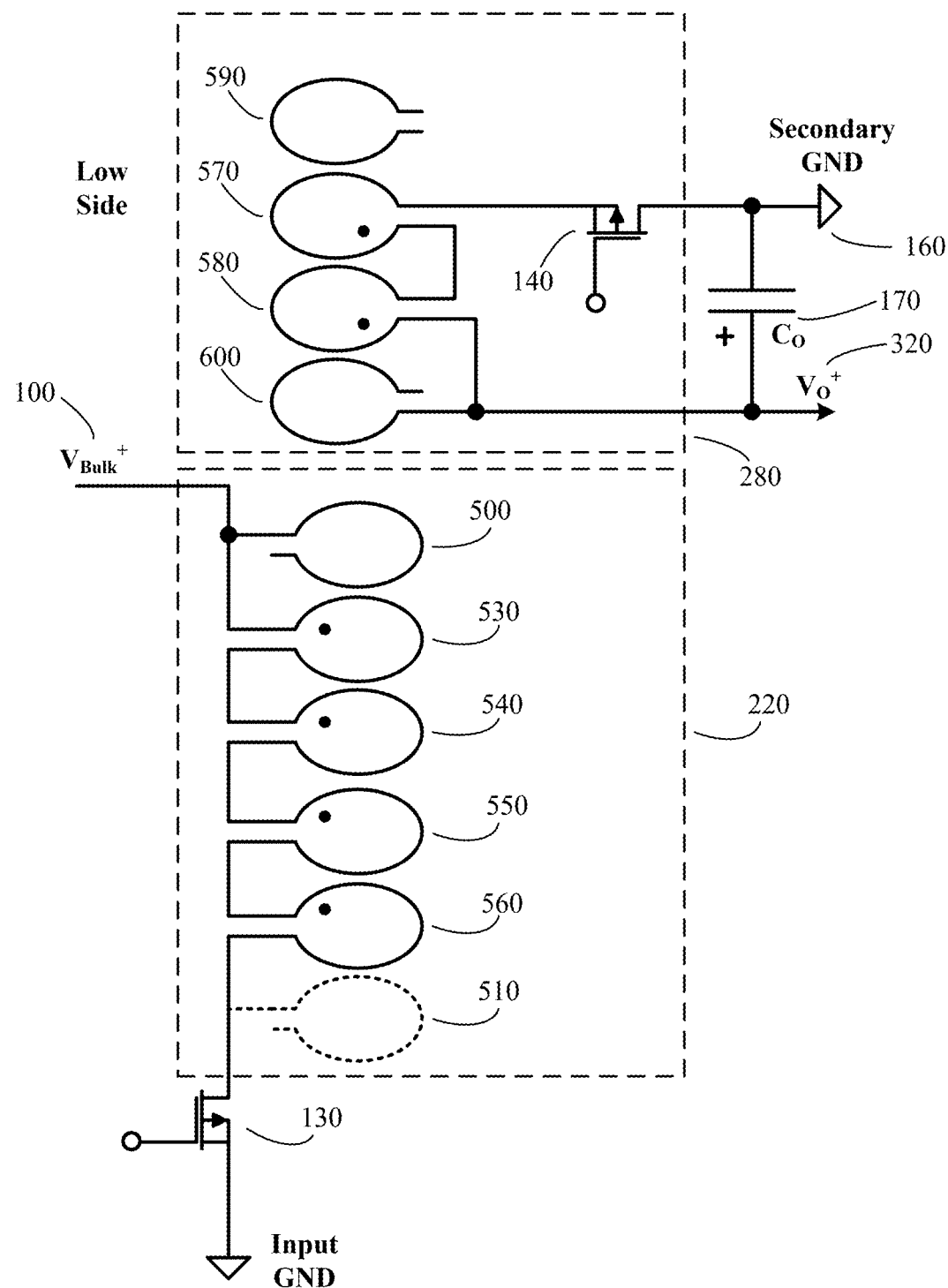
FIG. 10 illustrates one of the embodiments, wherein the secondary uses "high side" SR implementation and the secondary board does have a shield.

In FIG. 9 is presented the third embodiment of this invention. The primary board, 220 contains a shield placed on the top layer, 500, and underneath are placed the other transformer winding of the primary board. In the secondary board we will have also a shield placed on the layer 600, a layer adjacent to the layer 500 of the primary board when the secondary board 280 is placed on top of the primary board 220. The secondary windings are placed on the layers 580 and 570. The layer 590 can be used as a shield or for other purposes.

Besides the common mode noise caused by the displacement current through the parasitic capacitance between the primary winding and the secondary winding, the common mode noise can be produced also by the noise injection between the magnetic core and the primary and secondary winding or by other noise sources in the layout referred in this patent as "non transformer common mode noise". For example a noise injection can be produced by the "noisy section" of the primary circuit connected to the drain of the primary switch 130, which has a very high dv/dt, which will inject noise via the parasitic capacitances between said "noisy section" of the primary circuit and the secondary components.

In conclusion the total suppression of the common mode noise between primary and secondary windings in the transformer does not totally eliminate the common mode noise.

In order to further reduce the common mode noise in a power converter a noise cancelation technique should be employed. The noise cancellation technique consists in injecting a signal, between primary and secondary ground, signal which has the proper amplitude, polarity and phase which will cancel the noise injected via the means previously described.

One method of noise injection can be done between the primary shield and the secondary shield. In the multilayer PCB magnetic technology as described by Jitaru in U.S. Pat. No. 5,990,776, the parasitic capacitances between primary and secondary winding can be better controlled in production than the traditional wire wound magnetic technologies.

A "dual function shield", it is shield which does have two functions. One primary function of the "dual function primary shield" is to create a low impedance path for the noise injected by the transformer primary windings, to the primary "quiet termination" and prevent that noise to reach the secondary windings and secondary shield, when the secondary shield does exist, and to prevent reaching the secondary "quiet termination". The second role of the primary "dual function shield" is to inject into the secondary windings, including the secondary shield, when secondary shield does exist, a displacement current of an amplitude and polarity designed to cancel the common mode noise between primary to the secondary of the power converter in a such way that the total common mode noise in between primary and secondary to be significantly reduced towards zero.

This definition does apply also to the dual function shield in the secondary. A "dual function shield" in the secondary, it is shield which has two roles. One primary role of the "dual function secondary shield" is to create a low impedance path for the noise injected by the transformer secondary windings towards the secondary "quiet termination" and prevent that noise to reach the primary windings and primary shield, when the primary shield does exist, and prevent further flow of said noise to the primary "quiet termination". The second role of the secondary "dual function shield" is to inject into the primary windings, including the primary shield, when the primary shield does exist, a displacement current of an amplitude and polarity designed to cancel the common mode noise between secondary to the primary of the power converter in a such way that the total common mode noise in between primary and secondary of the power converter to be significantly reduced towards zero.

"Controlled dual function shield" it is a "dual function shield" wherein the noise injection between primary and secondary is adjustable and controlled.

Figure 6A:
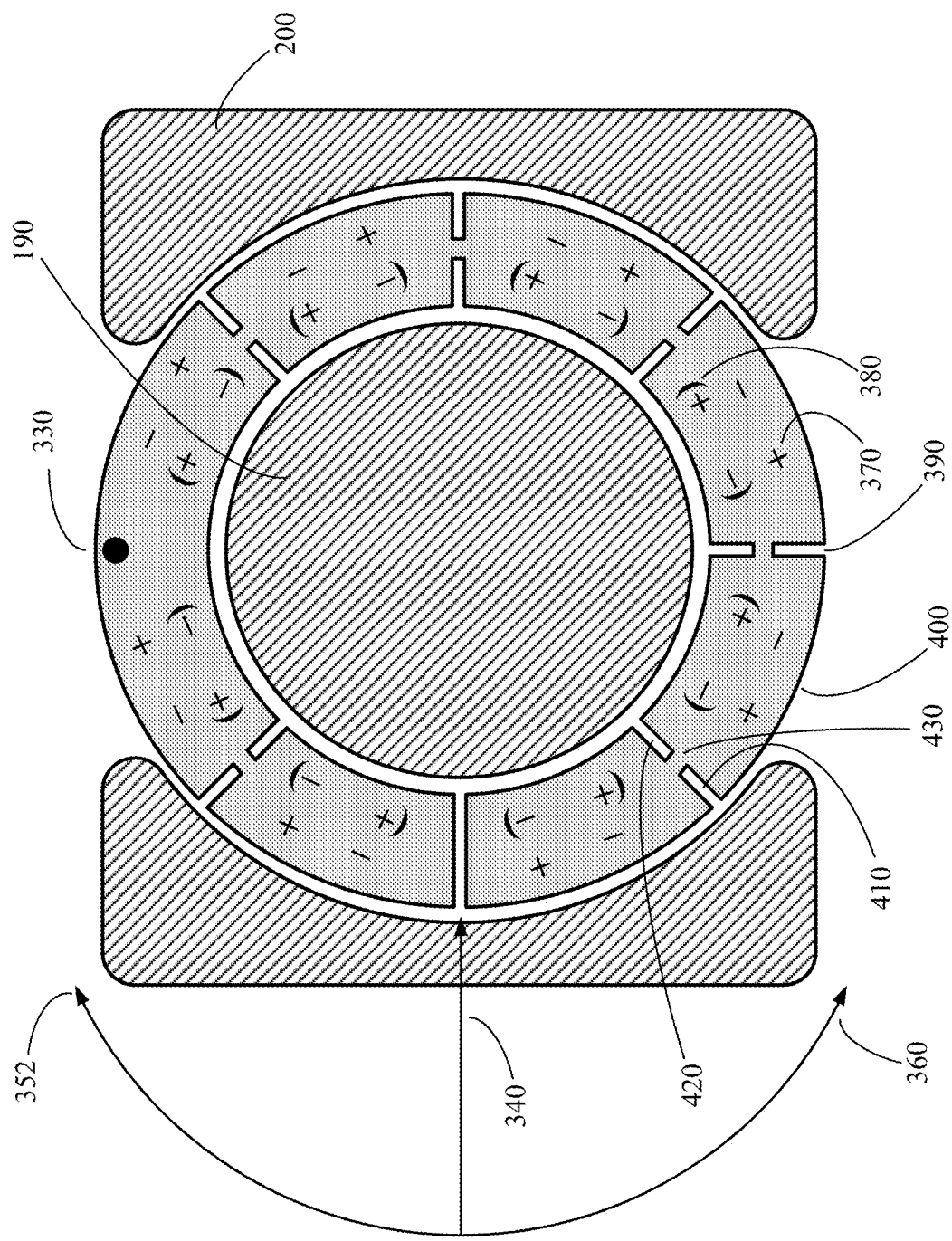
FIG. 6A presents one of the key embodiments, "Controlled dual function shield"

In FIG. 6A is presented a configuration for the "Controlled dual function shield" for the primary and secondary shield which can be used to tailor the amplitude and polarity of the noise injection in order to minimize the common mode noise in a power converter. Initially we will describe the primary side "Controlled dual function shield".

The primary "Controlled dual function shield" is formed by a conductive material placed on the primary shield layer, 500. The "controlled dual function shield" is connected to a primary "quiet termination", 330, from FIG. 6A. In the design phase of the transformer the shield is formed by multitude of cells, 400, connected in between by a short trace 430, for electrical connectivity. The voltage induced in each cell has a given amplitude and a polarity, which changes during the converter operation, as depicted by 370, and 380. The cells are partially cut out by slots such as 420 and 410 and connected in between by a short trace such as 430.

On this shield there is also a total cutout, 340 slot. The location of the total cutout slot, 340, versus the connection to the "quiet termination" plays a key role in noise injection.

Figure 6B:
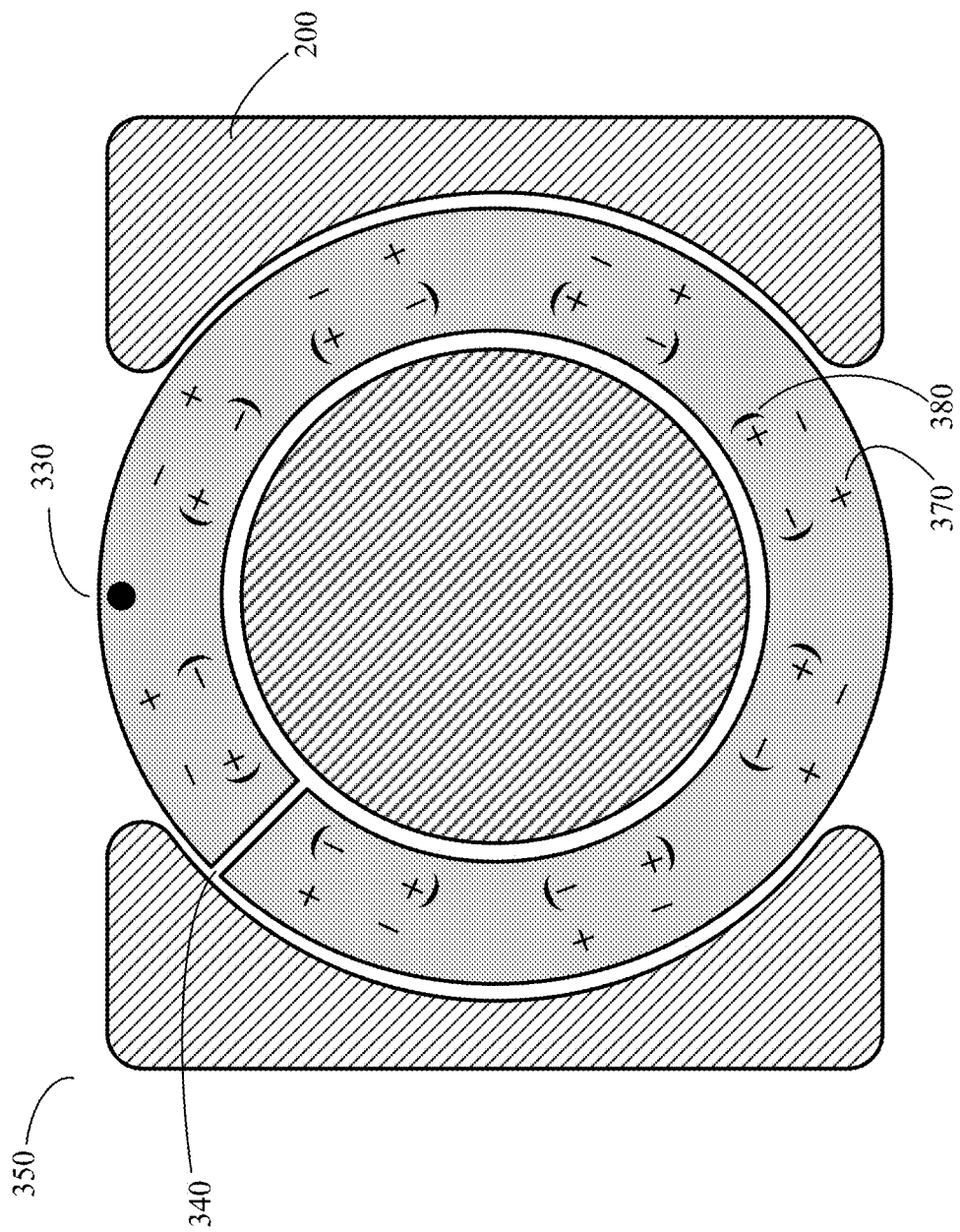
FIG. 6B presents one of the key embodiments, "Controlled dual function shield" with an example of the location of the total cutout.
Figure 6C:
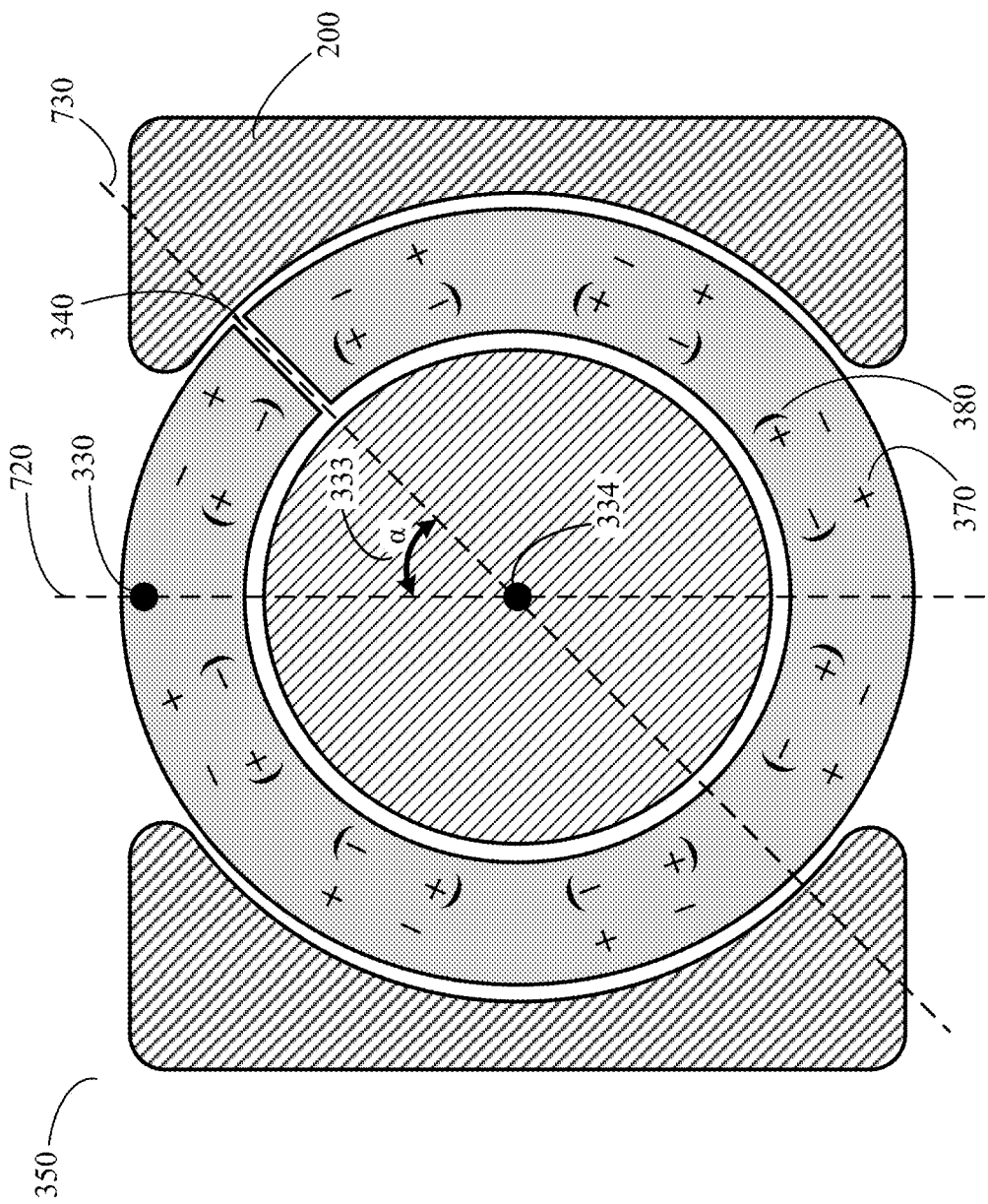
FIG. 6C presents one of the key embodiments, "Controlled dual function shield" with another example of the location of the total cutout.

As depicted in FIG. 6C, a base line, 720, unites the center of the magnetic core center post, 334, and the connection to the "quiet termination", 330. The "cutout line", 730, is defined by the center of the magnetic center post, 334 and the total cutout, 340. An angle "a", 333, represents the angle in between the main line and cutout line. The cutout, 340, can shift clockwise, in the direction, 352, or contra clockwise, in direction, 360 as depicted in FIG. 6A. Shifting the total cutout we do modify the displacement current between the primary shield and secondary layer placed on the secondary board adjacent to the primary board. For example, in FIG. 6D, the total cutout, 340, is diametral oppose to the primary connection to "quiet termination" 330. In FIG. 6B and FIG. 6C are depicted another example of cutout placement, which will control the amplitude and polarity of the displacement current between primary and secondary shield.

In the tunning process, the total cutout 340, starts from the cells close to the connection to the "quiet termination", (α=0) and move clockwise and contra clockwise and measure the common mode noise at the input EMI filter. In this way by rotating the location of the cutout, 340, the optimal location of the total cutout can be identified, wherein the common mode noise has the lowest amplitude.

Figure 6D:
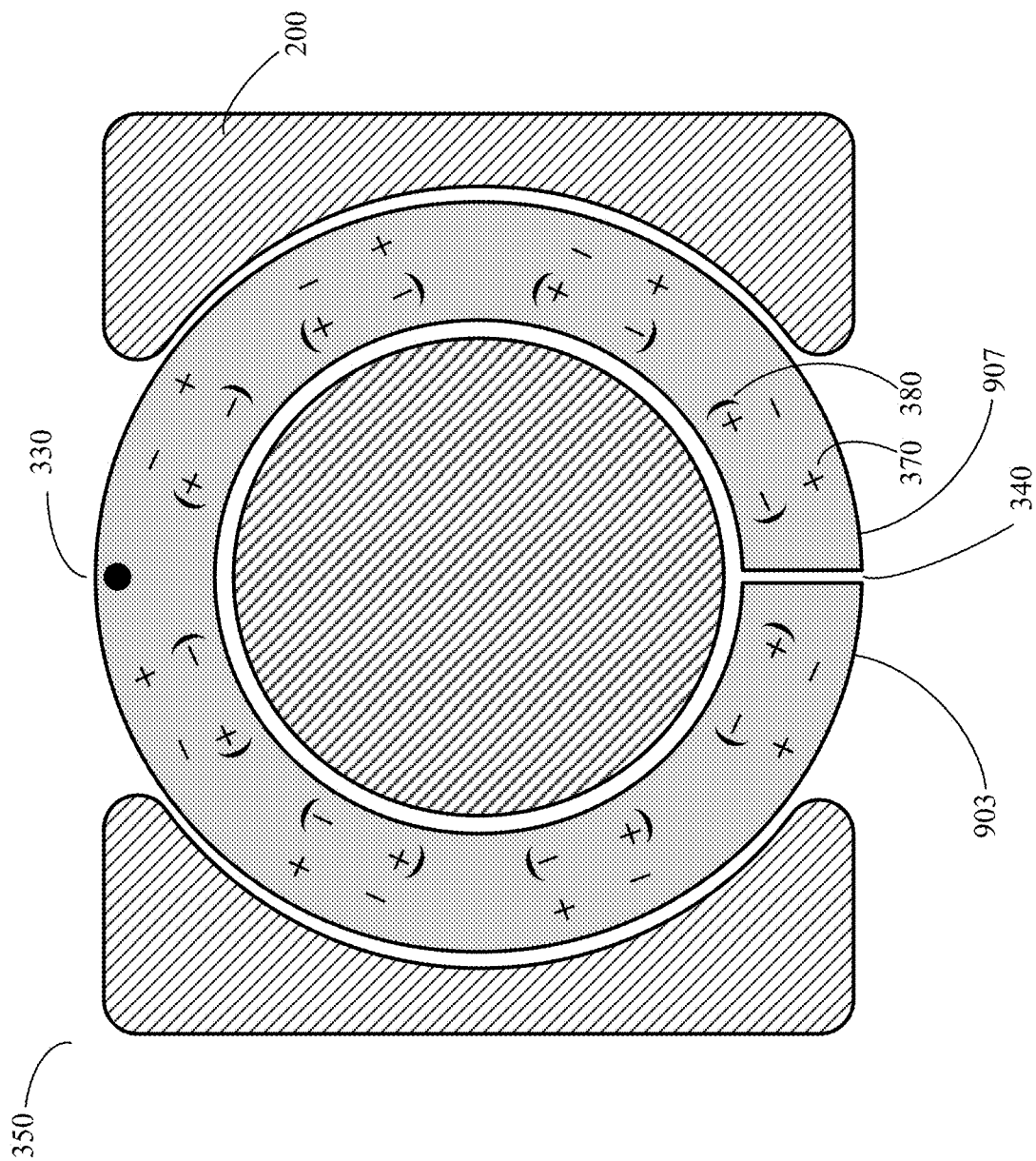
FIG. 6D presents one of the key embodiments, "Controlled dual function shield" with the total location diametral opposed to the "quiet termination" location.

As depicted in FIG. 6D with the polarity depicted by 370, in the right side of the total cutout, 907, reported to 330, there is a positive half turn voltage amplitude while in the left side of the total cutout, 903, there is a negative half turn voltage amplitude. For a secondary board, 280, placed on top of said primary board, 220, with a shield winding 600, adjacent to said primary shield and with the bottom layer of said secondary board, 250, not metalized, and having said primary shield as depicted in FIG. 6D, the displacement current produced by left side of the primary shield, 903, is cancelled by the displacement current produced by the right side of the primary shield, 907.

By rotating the total cutout, 340, clockwise or contra clockwise the noise injection between the primary shield, 500 into the secondary shield 600, can be controlled in amplitude and in polarity. This tunning can be done at the level of prototype. In large production, because in multilayer PCB magnetic technology the consistency of the parasitic capacitance between windings is very good, the location of the total cutout 340 will be kept after is optimized in the prototype. In the second embodiment of this invention, the primary winding has a shield on the top later, said primary shield which is connected to the primary GND. There is also a shield located on the bottom layer of the secondary board, above the non-metalized, layer, wherein the bottom layer of the secondary board is placed above the top layer of the primary board.

A primary "controlled dual function shield" is formed by an electrically conductive material placed on the primary shield layer and connected to a primary "quiet termination". By moving the cutout, 340, clockwise or contra clockwise, in reference to said "quiet termination" the polarity and amplitude of noise injected by said "controlled dual function shield" to the secondary winding placed on the secondary board adjacent to the "controlled dual function shield", the noise injection can be controlled.

Figure 6E:
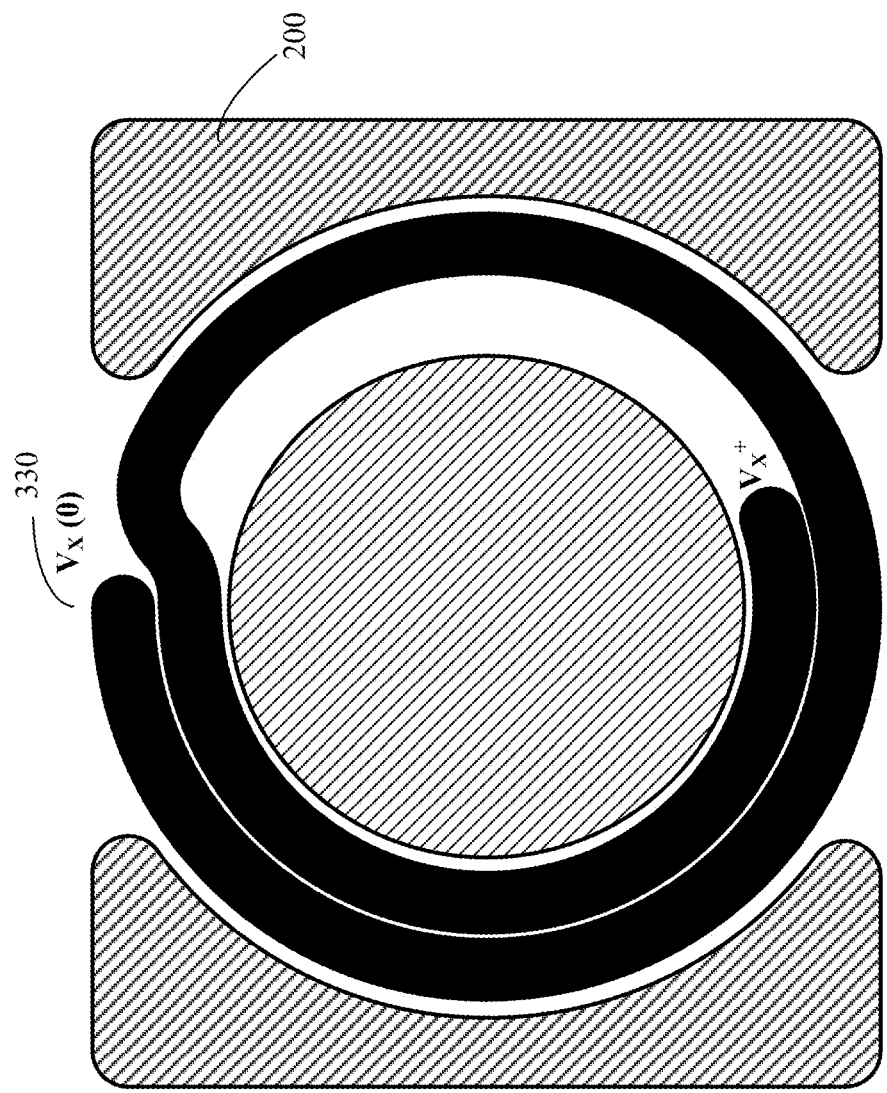
FIG. 6E presents one of the key embodiments, "Controlled dual function shield" with more than a turn design for the shield.
Figure 6F:
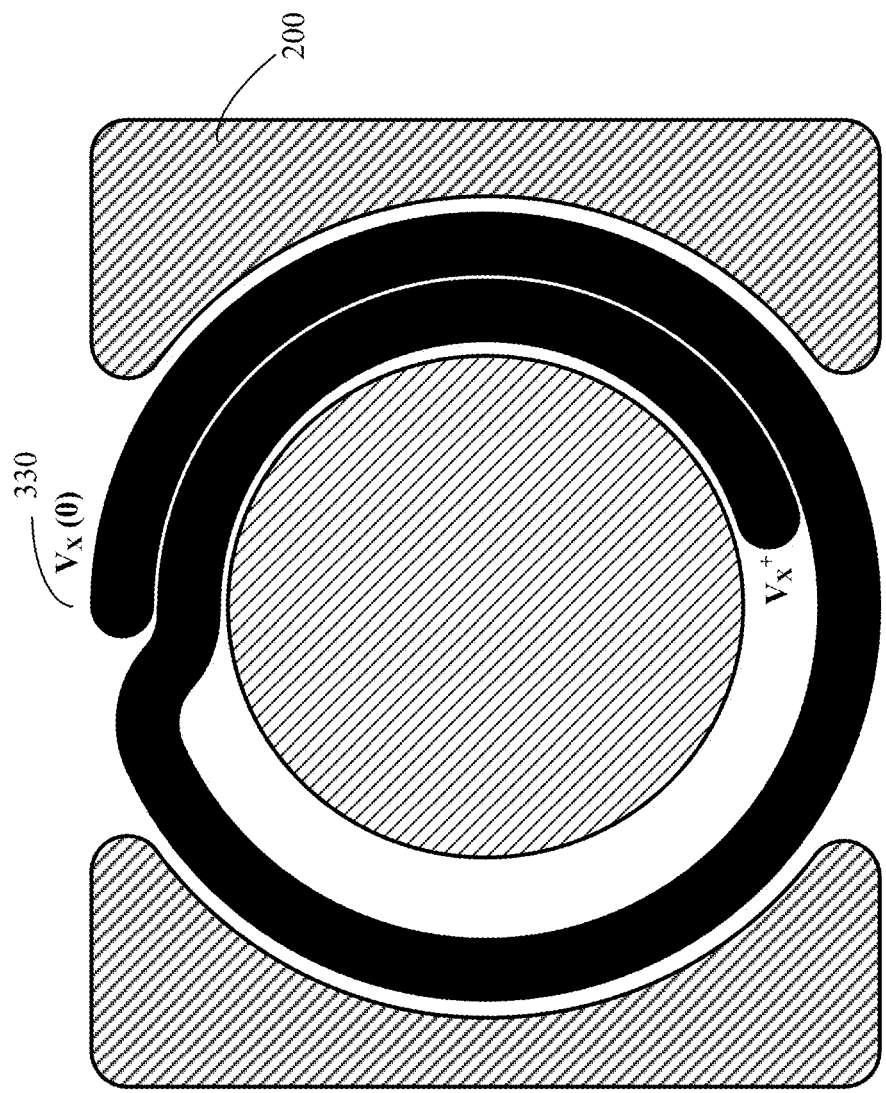
FIG. 6F presents one of the key embodiments, "Controlled dual function shield" with more than a turn design for the shield but opposite polarity to the example from FIG. 6E.

The same type of shield can be implemented for the secondary shield and the connection 330 in the secondary shield will go the secondary "quiet terminal" such as secondary ground, 160 or Vo+, 320 from FIG. 1. Said total cutout, 340, of the primary shield and the total cutout of the secondary shield are moved clockwise or counterclockwise until the noise injection between the primary shield and the secondary shield leads to total cancelation of the common mode. Once the locations of the total cutouts are identified, the position will be held fixed in the production setting. The displacement current in between de primary shield and the secondary shield, is tailored to cancel the common mode noise in such a way that the total common mode between primary and secondary is zero. In some application the noise cancelation amplitude has to be higher and in such cases the shield winding in primary and secondary can have the shape depicted in FIGS. 6E and 6F. The voltages at the termination of the shield are Vx+ and Vx−. By tailoring the shape of the primary and secondary shield and its polarity a controlled displacement current can be injected in between primary and secondary in such way that the common mode current which flows in between said primary and secondary ground is zero.

In this embodiment we presented the "controlled dual function shield" in planar transformers. The same concept can apply also in conventional transformers wherein the shield winding will have the shield effect and also the controlled noise injection by tunning the number of turns in the shield.

Fourth Embodiment

Figure 11A:
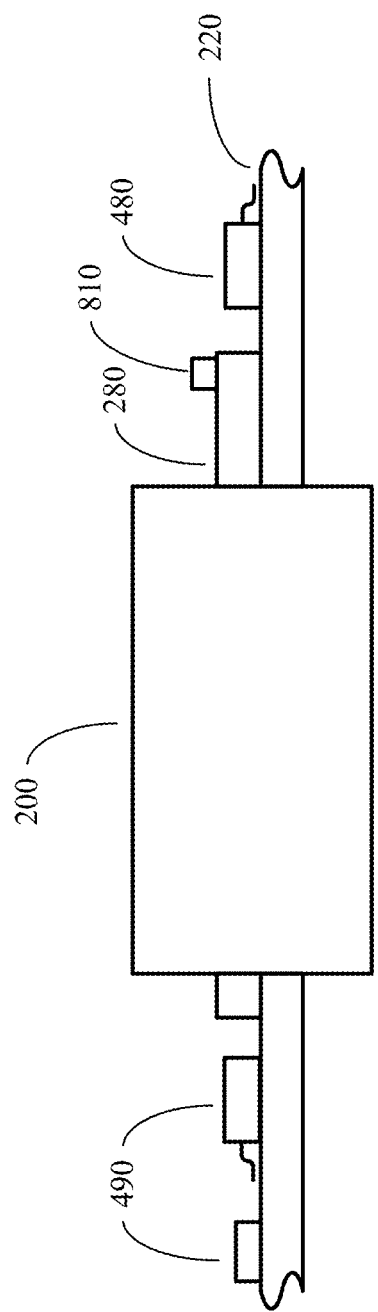
FIG. 11A illustrates one of the embodiments, wherein the secondary board has some components on it, and it is placed on top of primary board.
Figure 14:
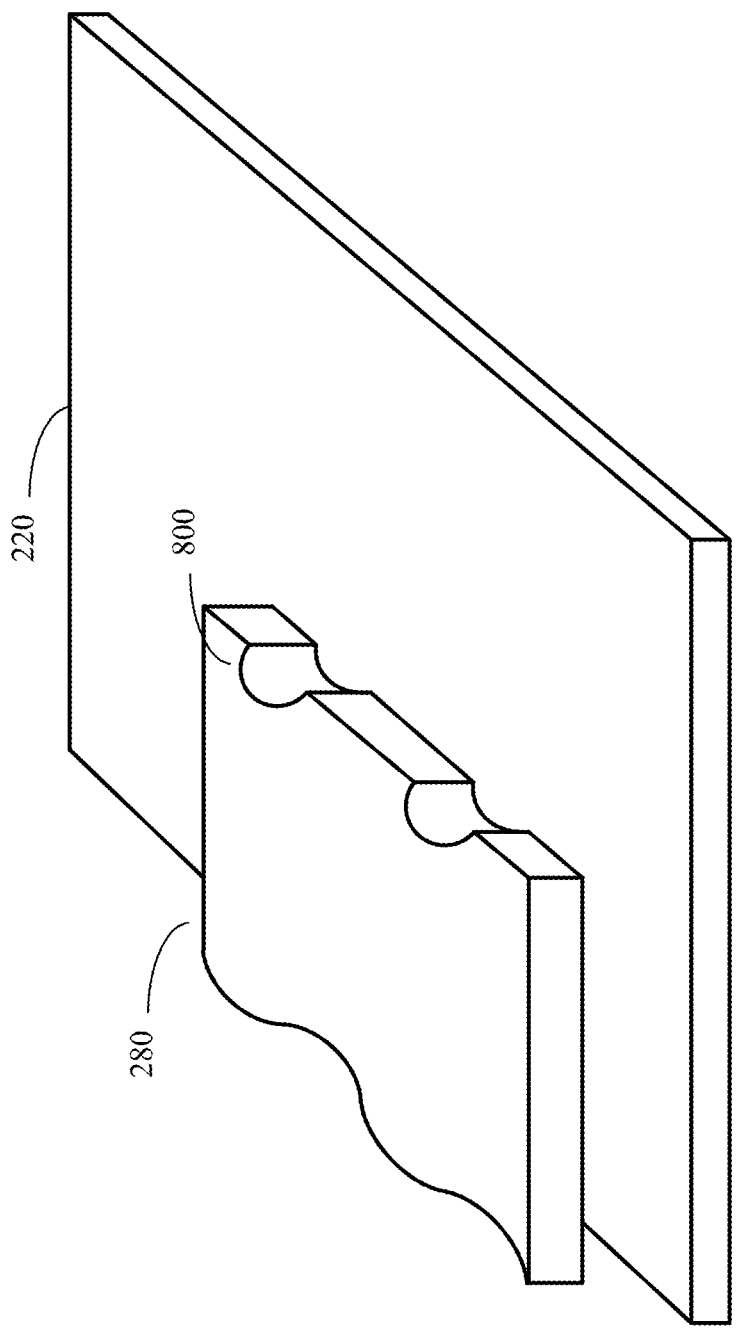
FIG. 14 illustrates one of the embodiments, wherein primary board and secondary board are connected by the use of plated half hole cut interconnection type.

The primary board 220, can be part of the mother board containing most of the electronic components. This solution has the advantage that it eliminates the electronic interconnection pins. This solution is described in the U.S. Pat. No. 5,990,776. In the solution presented in the U.S. Pat. No. 5,990,776 all the windings such as primary winding, the secondary windings and the auxiliary windings primary windings can be buried inside of the multilayer PCB, referred also as the mother board and some of the components and some power components can be placed on top of the transformer winding. This prior art solution from U.S. Pat. No. 5,990,776, has several drawbacks. The major drawback is that the number of layers required for the primary windings, the secondary winding and the auxiliary windings will lead to an expensive mother board because the large number of layers which is required. In this embodiment the secondary board, 280, containing the secondary winding will be a smaller PCBs which is placed above the mother board as depicted in FIG. 11A. The interconnection between the secondary board and the primary board can be done with simple, plated half hole cut as depicted in FIG. 14. The plated half hole cut allows the solder to create a very good connection and the plate around the half hole cut ensure a very good electrical connection. Other solutions such as interconnection pins can be also used.

In some applications there are not layers available for a shield in the secondary. In such cases the secondary winding which is connected to a secondary "quiet termination" which is placed on the bottom layer which is metalized, such as layer 600 from FIG. 3. This case is depicted in FIG. 7, and FIG. 8. Because no shield is placed in the layer 600 adjacent to the primary board, a displacement current is produced by said secondary winding placed on layer 600 into the primary shield 500, said displacement current which is produced by the voltage swing in the secondary winding which is placed on layer 600. In such cases the displacement current produced by the secondary winding from layer 600 into the primary shield 500, can be cancelled by the displacement current injected by the primary shield 500 which is a controlled dual function shield employing the adjustable noise injection technique from embodiment 3.

Fifth Embodiment

In this embodiment, the transformer is formed by a primary board 220, wherein the primary windings are embedded, and the secondary windings are embedded into the secondary board which is soldered to the primary board as presented in FIG. 11A. The board 220 is also the mother board wherein the components of the AC-DC converter are placed.

Additional components such as 810 from FIG. 11A are placed on the secondary board. Such components can be the synchronized rectifiers, 140, the controller of the synchronized rectifier and some of the output capacitors part of Co, 170. By placing the synchronized rectifier, 140 and some of the Co, 170 the stray inductance in between the secondary winding 120 and the Co, is reduced and "the end effects" associated with the secondary wining, 120 are also decreased.

Sixth Embodiment

Figure 11B:
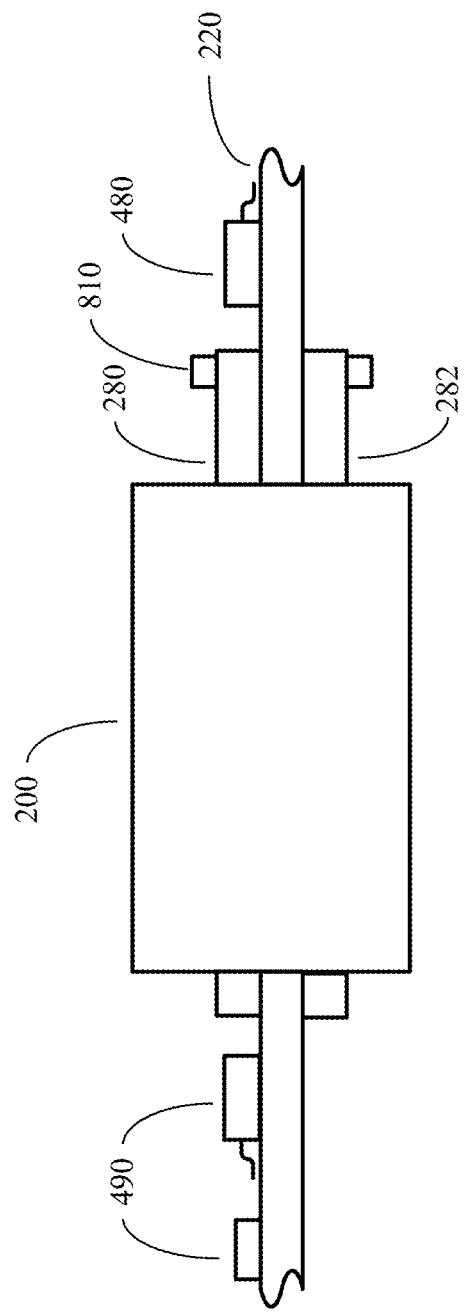
FIG. 11B illustrates one of the embodiments, wherein there are two secondary boards placed on top and bottom of the primary board and said secondary boards have some components on it.

In U.S. Pat. No. 6,466,454 B1 are presented different methods of interconnecting multiple boards and using one magnetic core. This packaging concept wherein the primary windings are placed on the mother board has additional advantages, such as the use of windings around the outer leg of the transformer for different applications such as auxiliary windings and fractional turns. In this embodiment there are not interconnection pins neither for the primary winding board and neither for the secondary board. In some of the applications, the copper thickness for the secondary winding needs to be higher, leading to a more expensive board. Placing the secondary windings on a more expensive board but of much smaller dimensions, leads to a lower total cost for the multilayer planar transformer comparative with more conventional solutions wherein the primary and the secondary windings are placed on the same multilayer PCB. In this patent key embodiment wherein the secondary bord containing the secondary windings is placed on one side, top or bottom, of the multilayer PCB containing the primary winding will increase the leakage inductance between the primary and secondary winding. A solution is to place two secondary boards containing the secondary winding, one secondary board on one side of the primary board and another secondary board on the other side of the primary board as depicted in FIG. 11B.

Figure 12:
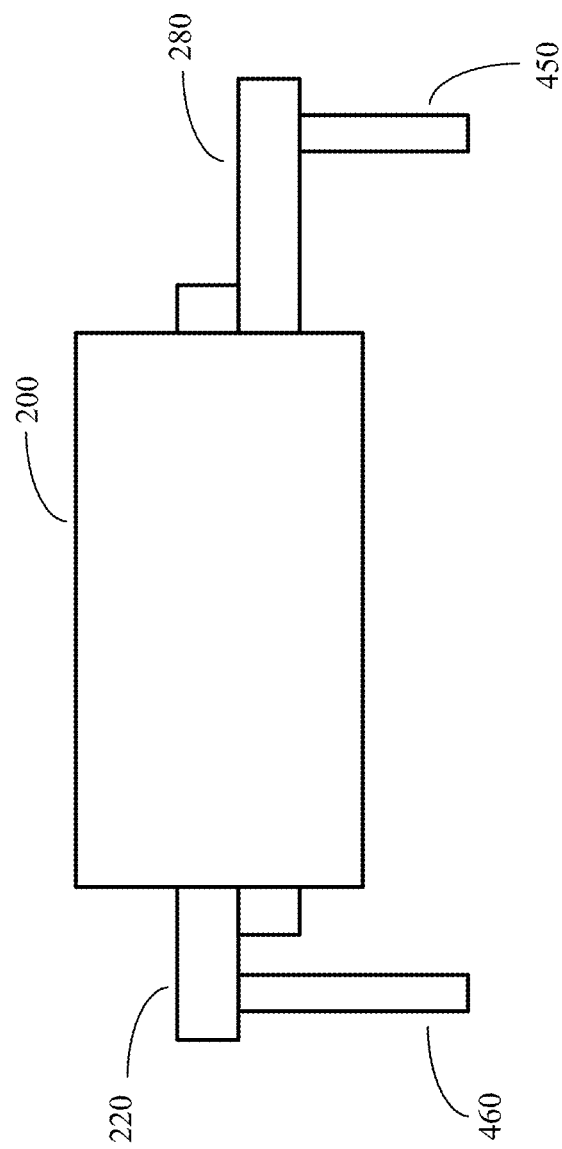
FIG. 12 illustrates one of the embodiments, wherein there are interconnection pins to connect the primary and secondary board to the mother board wherein the primary board is on top of the secondary board.
Figure 13:
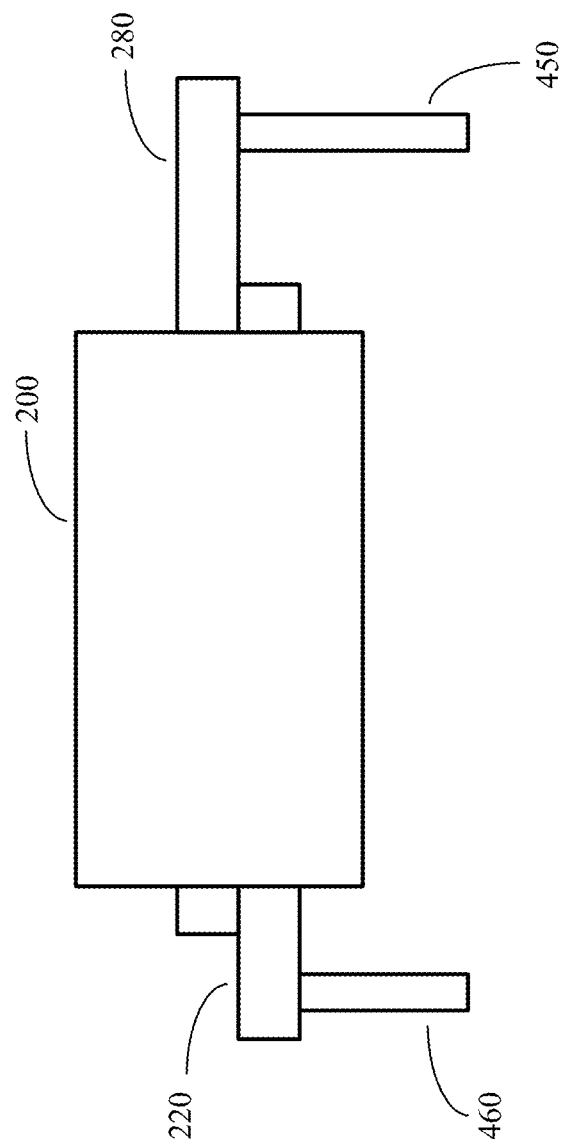
FIG. 13 illustrates one of the embodiments, wherein there are interconnection pins to connect the primary and secondary board to the mother board, wherein the secondary board is on top of the primary board.

In applications wherein the power density it is very high and we cannot afford to lose space for the components due to the magnetic core, the entire transformer can be elevated and there will be two boards, one primary board 220 which is connected to the mother board via the connectors, 460, and a secondary board, 280, connected to the mother board by connectors, such as 450. In FIGS. 12 and 13 is depicted the two boards planar transformer with the primary board on the bottom and the secondary board on the top and vice versa.

Seventh Embodiment

Another drawback of the previous embodiments is that the transformer built by a primary PCB and the secondary PCB placed at one side of the primary board increases the leakage inductance in between the primary and the secondary wining.

In the U.S. patent application Ser. No. 14/660,901, Magnetic Structures For Low Leakage Inductance And Very High Efficiency— U.S. patent application Ser. No. 14/660,901 filed Mar. 17, 2015 and further in Magnetic Structures For Low Leakage Inductance And Very High Efficiency— U.S. patent application Ser. No. 14/660,901 filed Mar. 17, 2015, is described a magnetic structure using multiple legs wherein the primary windings encircles successively the multiple posts, and also the secondary winding encircles successively the multiple posts. In such a structure the number of layers necessary for the primary windings are reduced.

In such magnetic structure the leakage inductance in between primary and secondary is reduced and that helps lowering the leakage inductance between the primary and secondary windings even if we place the secondary winding on a separate board at one side of the primary PCB.

Figure 15:
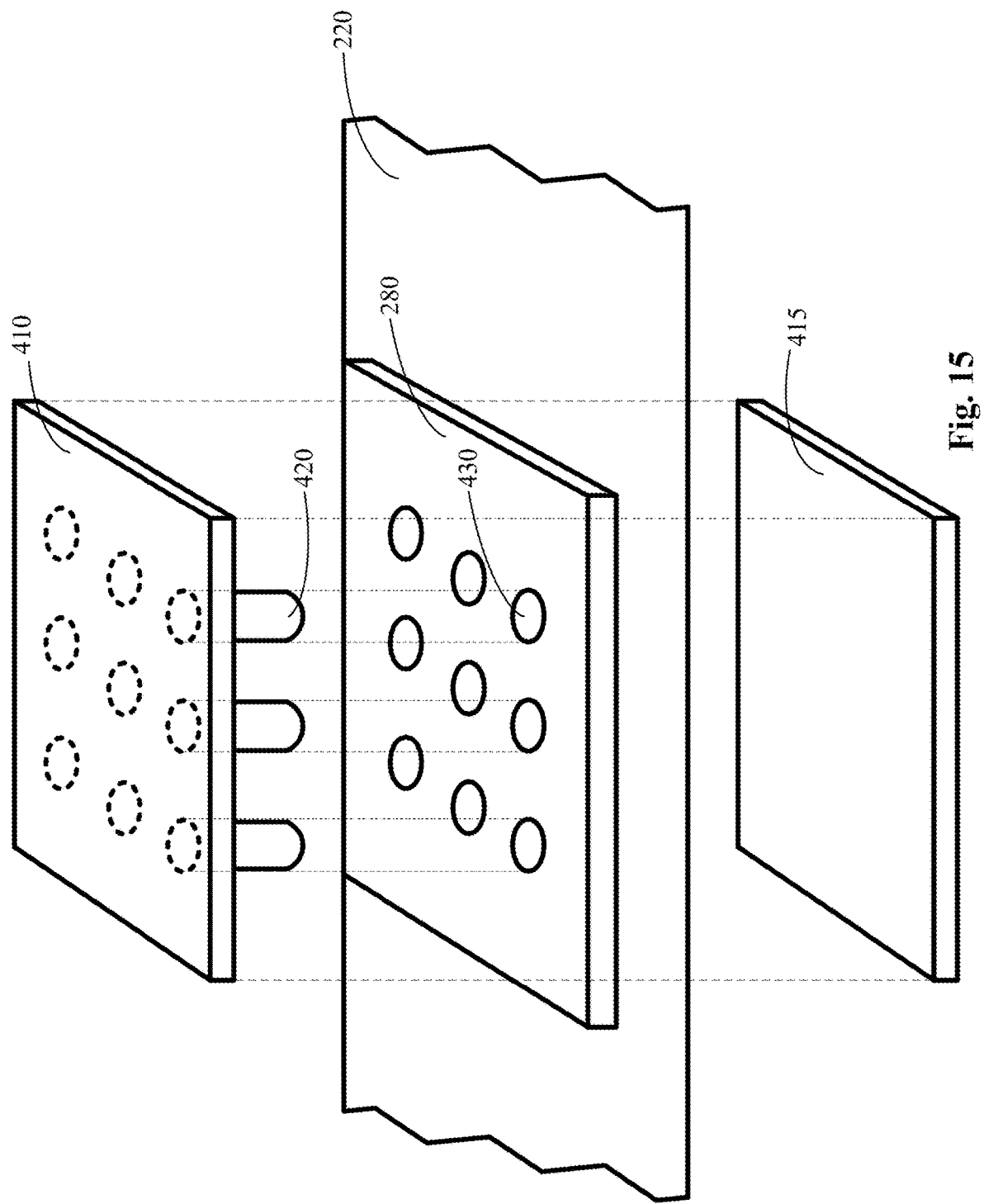
FIG. 15 illustrates one of the embodiments, wherein the magnetic core has multiple posts which penetrates primary and secondary boards.

In FIG. 15 is depicted such a structure. There is a primary board 220, and a secondary board on top of it, 280. A multiple posts core 410, with posts 420, are placed in such way that the posts, penetrate through the holes 430 placed in the secondary board, 280 and the primary board 220. A magnetic plate 415 is placed on the other side of said posts 420 to close the magnetic field path.

Eighth Embodiment

Figure 16:
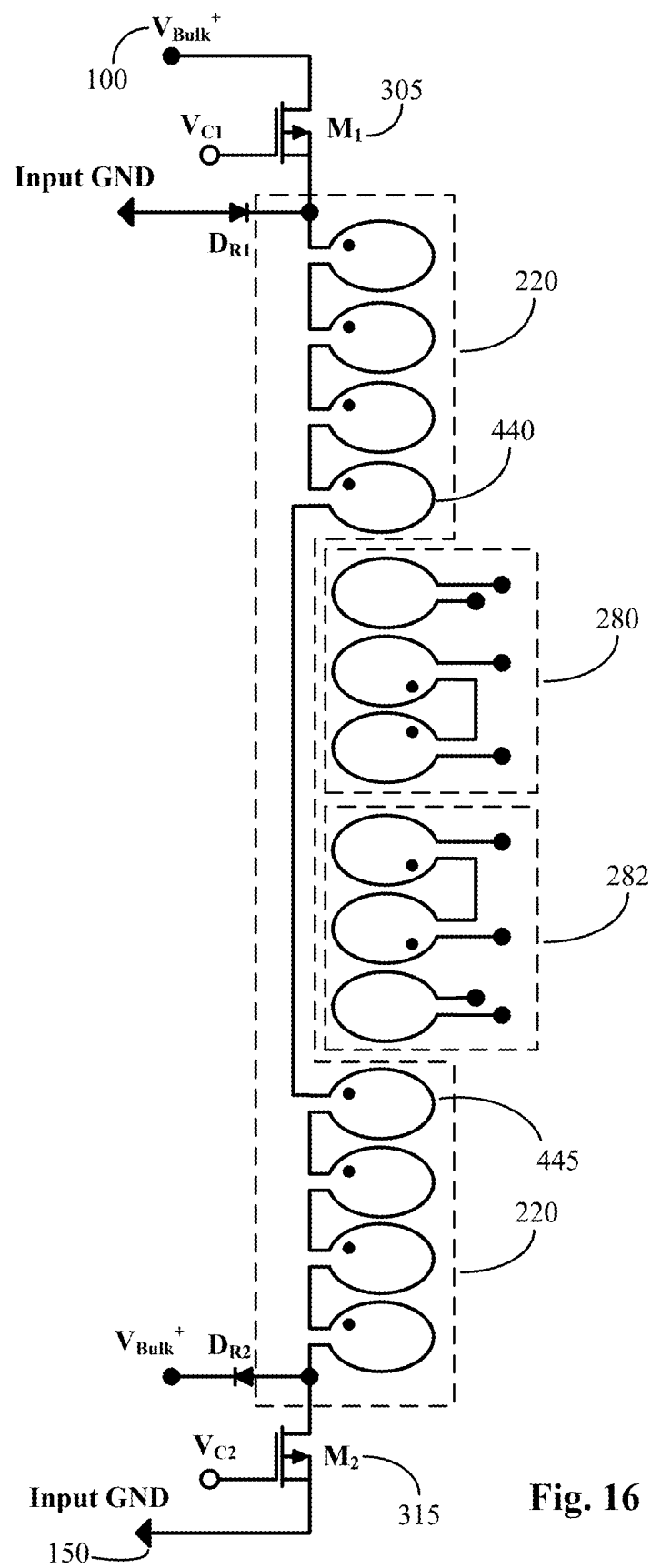
FIG. 16 illustrates one of the embodiments, wherein the primary and secondary boards are applied to a two-transistor forward topology.

In FIG. 16 is depicted another multiple board structure in building the magnetic for a two-transistor forward topology. This topology contains two switching elements, M1, 305 and M2, 315 which are placed in series with the primary winding. Two reset diodes Dr1, and Dr2 are also part of the power train. In this topology both switchers M1 and M2 do turn on and off at the same time. As a result the middle of the primary winding has zero or a negligeable voltage swing reported to the "quiet termination" such as $V_{Bulk}+$, 100. In such application the secondary windings shall be placed in the middle of the primary windings as depicted in FIG. 16. The primary winding is placed on the primary board 220, which can be also the primary board and the secondary windings are distributed in such way that the windings on the top and bottom surface of the primary board are the windings in the middle of the primary windings such as 440 and 445. The secondary windings are part of the board 280 and 282. These boards are placed on top and the bottom of primary board 220.

In the drawing 16, the secondary boards, 280 and 282 do have a layer allocated for the secondary shield, layers which are adjacent to the primary board. There is no shield in the primary due to a very low voltage swing in the winding 440 and 445. However, in some cases wherein the EMI level must be very low two primary shields can be placed near layer 440 adjacent to the secondary board 280 and another shield can be placed in the primary board 220 close near the winding 445 on the layer adjacent to the secondary board 282. These two primary shields should be connected to the primary "quiet termination" such as Vbulk+, 100 or primary ground, 150.

Ninth Embodiment

Figure 17:
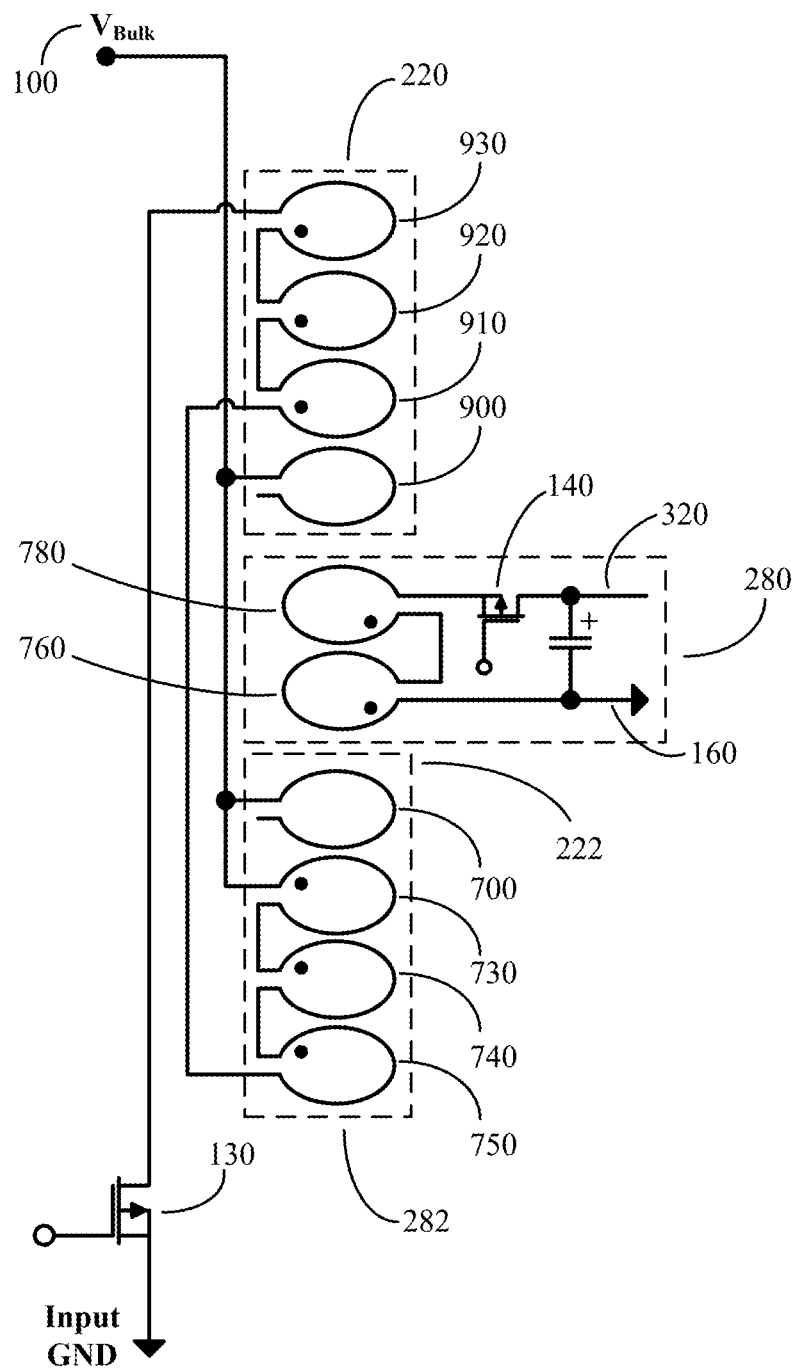
FIG. 17 illustrates one of the embodiments, wherein the secondary board is placed in between primary boards in flyback topology.

In FIG. 17 is depicted another multiple board structure in building the transformer for a flyback topology. In some flyback applications the leakage inductance energy is harvested and used for other purposes. However, at higher power flyback the leakage inductance must be kept low in order to increase the efficiency because the harvested energy will be too high. In FIG. 17 is presented such a case wherein the leakage inductance of the magnetic structure using multiple multilayer PCB is kept low by the use of an interleaving transformer structure wherein the primary boards 220 and 222 are placed on top and the bottom of the secondary board 220. The winding for the primary starts on the primary board 222 on the layer 730 and continue to the layer 740 and 750 from the primary board 222. Further the primary windings go the primary board 220 to the layers 910, 920 and 930 and the connection goes further to the drain of primary switch 130, In the primary there are placed two shields 700, on the primary board 222 and 900 on the primary board 220. In the drawing depicted in FIG. 17, there are not shield in the secondary winding 280. Is recommended that the primary shields 900 and 700 to be "Controlled double function shield" because the shield 900 is placed in vicinity of "noisy" windings such as the winding on layer 910. In addition to that the secondary board 290 does not have a shield. In the event shields will be placed on the secondary board, 280, "controlled double function shield" recommended. In such case the "controlled double function shield" in primary and secondary can be tuned in such way that the total common mode noise of the converter can be reduced to zero. In this embodiment, the secondary board is placed in the middle of the primary winding wherein the noise level is high, unlike the two-transistor forward topology. By employing two shields in the primary boards, 220 and 222 and of the type "Controlled double function shield" the total common mode in the power converter can be reduced substantially and if the secondary would employ the same "Controlled double function shield" the common mode noise of the power converter can be easily reduced to zero in spite of the fact that the secondary board is placed in between two primary boards wherein the windings are very noisy.

Preferred embodiments are fully and clearly described above so as to enable one having skill in the art to understand, make, and use the same. Those skilled in the art will recognize that modifications may be made to the description above without departing from the spirit of the specification, and that some embodiments include only those elements and features described, or a subset thereof. To the extent that modifications do not depart from the spirit of the specification, they are intended to be included within the scope thereof.

The invention claimed is:

1. A system for reducing common-mode noise, the system comprising components of:
a switch mode power supply including primary and secondary sides, primary and secondary side grounds, an input voltage source, a primary switch, a transformer, a core, and a power output, wherein the primary side and the secondary side have primary and secondary quiet terminations, respectively, wherein voltage does not change with respect to the primary side ground and with respect to the secondary side ground;
a magnetic element containing a magnetic core having at least two magnetic legs;
a primary multilayer board which embeds primary windings and first auxiliary windings which report to the primary windings, wherein the primary windings and the first auxiliary windings surround the magnetic legs;
a secondary multilayer board which embeds secondary windings and second auxiliary windings which report to the secondary windings, wherein the secondary windings and second auxiliary windings surround the magnetic legs;
wherein the magnetic core penetrates both the primary multilayer board and the secondary multilayer board; and
a layer of the primary multilayer board which is adjacent to the secondary multilayer board includes a controlled dual function shield which is connected to the primary quiet termination.

2. The system for reducing common-mode noise of claim 1, wherein some of the components of the system are placed on the primary multilayer board.

3. The system for reducing common-mode noise of claim 1, wherein some of the components of the system are placed on the primary multilayer board and on the secondary multilayer board.

4. A system for reducing common-mode noise, the system comprising components of:
a switch mode power supply including primary and secondary sides, primary and secondary side grounds, an input voltage source, a primary switch, a transformer, a core, and a power output, wherein the primary side and the secondary side primary and secondary quiet termination, respectively, wherein voltage does not change with respect to the primary side ground and with respect to the secondary side ground;
a magnetic element containing a magnetic core having at least two magnetic legs;
a primary multilayer board which embeds primary windings and first auxiliary windings, which report to the primary windings, wherein the primary windings and the first auxiliary windings surround the magnetic legs;
a secondary multilayer board which embeds secondary windings and second auxiliary windings which report to the secondary windings, wherein the secondary windings and the second auxiliary windings surround the magnetic legs;
wherein the magnetic core penetrates both the primary multilayer board and the secondary multilayer board; and
a layer of the secondary multilayer board which is adjacent to the primary multilayer board includes a controlled dual function shield which is connected to the secondary quiet termination.

5. The system for reducing common-mode noise of claim 4, wherein some of the components of the system are placed on the primary multilayer board.

6. The system for reducing common-mode noise of claim 4, wherein some of the components of the system are placed on the primary multilayer board and on the secondary multilayer board.

7. A system for reducing common-mode noise, the system comprising components of:
a switch mode power supply including primary and secondary sides, primary and secondary side grounds, an input voltage source, a primary switch, a transformer, a core, and a power output, wherein the primary side and the secondary side have primary and secondary quiet terminations, respectively, wherein voltage does not change with respect to the primary side ground and with respect to the secondary side ground;
a magnetic element containing a magnetic core having at least two magnetic legs;
a primary multilayer board which embeds primary windings and first auxiliary windings which report to the primary windings, wherein the primary windings and the first auxiliary windings surround the magnetic legs;
a secondary multilayer board which embeds secondary windings and second auxiliary windings which report to the secondary windings, wherein the secondary windings and the second auxiliary windings surround the magnetic legs;
wherein said magnetic core penetrates both the primary multilayer board and the secondary multilayer board; and
a layer of the secondary multilayer board which is adjacent the primary multilayer board includes a controlled dual function shield which is connected to the secondary quiet termination; and
a layer of the primary multilayer board which is adjacent to the secondary multilayer board includes a controlled dual function shield which is connected to the primary quiet termination.

8. The system for reducing common-mode noise of claim 7, wherein some of the components of the system are placed on the primary multilayer board.

9. The system for reducing common-mode noise of claim 7, wherein some of the components of the system are placed on the primary multilayer board and on the secondary multilayer board.

* * * * *